United States Patent
Beri et al.

(10) Patent No.: US 12,229,110 B2
(45) Date of Patent: Feb. 18, 2025

(54) TEXT CO-EDITING IN A CONFLICT-FREE REPLICATED DATA TYPE ENVIRONMENT

(71) Applicant: Adobe Inc., San Jose, CA (US)

(72) Inventors: Tarun Beri, Noida (IN); Kush Pandey, Aligarh (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/890,203

(22) Filed: Aug. 17, 2022

(65) Prior Publication Data

US 2024/0061826 A1 Feb. 22, 2024

(51) Int. Cl.
*G06F 16/23* (2019.01)
*G06F 16/22* (2019.01)

(52) U.S. Cl.
CPC ...... *G06F 16/2315* (2019.01); *G06F 16/2246* (2019.01); *G06F 16/2379* (2019.01)

(58) Field of Classification Search
CPC ............. G06F 16/2315; G06F 16/2246; G06F 16/2379
See application file for complete search history.

(56) References Cited

U.S. PATENT DOCUMENTS

| 10,997,770 B1 | 5/2021 | Kumawat |
| 2013/0173727 A1 | 7/2013 | Libin et al. |
| 2016/0328624 A1 | 11/2016 | Angelov et al. |
| 2018/0052813 A1 | 2/2018 | Laupretre et al. |
| 2019/0371008 A1 | 12/2019 | Peterson |
| 2020/0349220 A1* | 11/2020 | Veselov ................ G06F 9/5016 |
| 2021/0312119 A1* | 10/2021 | Nelson .................. G06F 40/134 |
| 2022/0005285 A1 | 1/2022 | Batra et al. |

(Continued)

FOREIGN PATENT DOCUMENTS

| CN | 101465973 B | 12/2010 |
| GB | 2504653 A | 2/2014 |
| WO | 2013/186543 A2 | 12/2013 |

OTHER PUBLICATIONS

Fraser, Neil, "Differential Synchronization," Proceedings of the 9th ACM symposium on Document engineering (DocEng '09). Association for Computing Machinery, New York, NY, USA, Sep. 2009, pp. 13-20.

(Continued)

*Primary Examiner* — Mark D Featherstone
*Assistant Examiner* — Samuel C Sharpless, III
(74) *Attorney, Agent, or Firm* — Nicholson De Vos Webster & Elliott LLP

(57) ABSTRACT

Embodiments are disclosed for managing text co-editing in a conflict-free replicated data type (CRDT) environment. A method of co-editing management includes detecting a burst operation to be performed on a sequential data structure being edited by one or more client devices. A segment of the sequential data structure associated with the burst operation is determined based on a logical index associated with the burst operation. A tree structure associated with the segment is generated, where a root node of the tree structure corresponds to the burst operation. A global index for the root node of the tree structure is determined and an update corresponding to the burst operation, including the root node and the global index, is sent to the one or more client devices.

20 Claims, 14 Drawing Sheets

(56) References Cited

U.S. PATENT DOCUMENTS

2023/0061779 A1 3/2023 Beri
2023/0367754 A1 11/2023 Beri et al.

OTHER PUBLICATIONS

Greenspan, David, "Implementing Fractional Indexing," Mar. 9, 2020, retrieved from Internet: https://observablehq.eom/@dgreensp/implementing-fractional-indexing.

Letia et al., "CRDTs: Consistency without concurrency control," INRIA Rocquencourt, Jun. 2009, 17 pages.

Nelson, Joe, "User-defined Order in SQL," begriffs.com, Mar. 20, 2018, retrieved from Internet: https://begriffs.com/posts/2018-03-20-user-defined-order.html.

Non-Final Office Action, U.S. Appl. No. 17/742,256, Dec. 19, 2023, 11 pages.

Office Action, GB App. No. 2308862.8, Nov. 6, 2023, 07 pages of Original Document Only.

Preguica, et al., "Conflict-Free Replicated Data Types: An Overview," 2018, 20 pages.

Roh et al., "Replicated abstract data types: Building blocks for collaborative applications," Journal of Parallel and Distributed Computing, 71(3), 2011, pp. 354-368.

Sun et al., "Operational Transformation for Collaborative Word Processing," Proceedings of the 2004 ACM Conference on Computer Supported Cooperative Work (CSCW '04), Association for Computing Machinery, Nov. 2004, pp. 437-446.

Wallace, Evan, "Realtime Editing of Ordered Sequences," Mar. 6, 2017, retrieved from Internet: https://www.figma.com/blog/realtime-editing-of-ordered-sequences/.

Weiss et al., "Logoot: A Scalable Optimistic Replication Algorithm for Collaborative Editing on P2P Networks," 29th IEEE International Conference on Distributed Computing Systems—ICDCS 2009, Jun. 2009, pp. 404-412.

Wolfram Mathworid, "Stern-Brocot Tree," retrieved from Internet: http://mathworld.wolfram.com/Stem-BrocotTree.html on May 20, 2022.

Notice of Allowance, U.S. Appl. No. 17/742,256, Mar. 15, 2024, 8 pages.

* cited by examiner

TEXT CO-EDITING IN A CONFLICT-FREE REPLICATED DATA TYPE ENVIRONMENT

BACKGROUND

As more workplaces adopt more work-from-home and hybrid working arrangements, work that was previously performed collaboratively by teams in person has to be performed remotely. Concurrent editing enables multiple users to edit the same document at the same time. Additionally, the rise of web or cloud-based applications has made co-editing possible for an increasing number of document types. For example, concurrent editing systems have been implemented for a wide variety of applications, such as word processing applications, spreadsheet applications, presentation applications, code editors, etc.

SUMMARY

Introduced here are techniques/technologies that provide an improved document co-editing management system. Embodiments use a Stern-Brocot Forest representation to track and propagate changes made by different editors. When multiple users are making changes to a document simultaneously, the system needs to ensure that each party can accurately apply changes received from other users. This requires that the users start from the same state and that as any one user changes the state of the document that the changes are accurately propagated to the other co-editing parties.

In some embodiments, the Stern-Brocot Forest representation is a two-tiered data structure that includes a logical tier and a physical tier. The logical tier represents the initial state of a sequential array, such as text data. In such instances, the logical tier includes an implicit index for each character of the text data. The physical tier represents changes made to the sequential array. For example, as text is added, deleted, replaced, etc., new nodes are added to a Stern-Brocot tree. Text is often input in bursts, either through typing or copy-paste operations. The input bursts are detected and associated with a compound node. The compound node is assigned a global and local index, with reserved indices for the text included in the compound node. This allows for future operations to be performed on the text while keeping global indices unchanged. Additionally, by not explicitly indexing characters within compound nodes until a change to those characters are made, compound nodes of arbitrarily large sizes can be handled efficiently.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
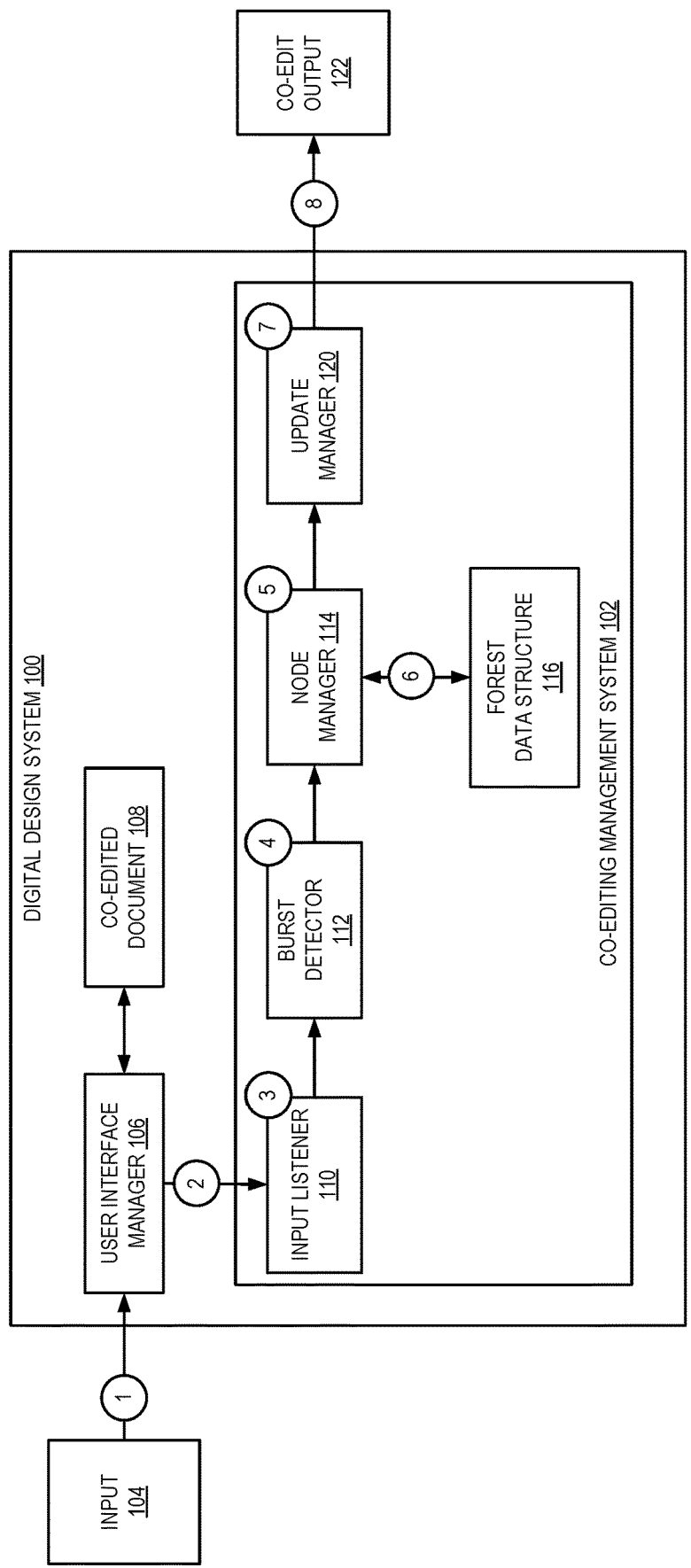
FIG. 1 illustrates a diagram of a process of co-editing management using compound nodes in accordance with one or more embodiments.

One or more embodiments of the present disclosure include a concurrent editing system that can efficiently manage text data in a conflict-free replicated data type (CRDT) environment. Collaborative real-time editors provide the ability for multiple users to simultaneously edit a shared document. A number of different techniques are used to implement such real-time collaboration, including CRDT and Operational Transformation (OT). OT has been used in the past for text co-editing. Such implementations depend on a key transformation function and a co-editing server that is aware of the current state of every co-editing client. While this works for text, it is difficult to implement for mixed (e.g., graphics and text) documents. Co-editing of graphical and mixed documents has become more popular, as has the desire for less complex co-editing environments that do not require dedicated co-editing servers. This has led to increased interest in CRDT-based techniques to implement the co-editing of graphical, hierarchical, and mixed documents.

CRDT was developed for co-editing simple data structures like arrays and hash tables. This leads to a number of challenges when attempting to apply CRDT to text data. For example, prior attempts to apply CRDT to text data have included treating every text character as an individual array element. This allows for CRDT protocols to be used to achieve consistency, but also lead to a number of drawbacks. For example, text is usually typed in bursts and treating each character as an independent array element leads to performance degradation. This problem is further exaggerated when copy-pasting large text content from another source. Additionally, burst types from two users at the same document location (e.g., at the same array index) leads to unwanted interleaving of their insertions. For example, 'dog' inserted by one user and 'cat' inserted by the other might become 'dcatog' instead of 'dogcat' or 'catdog'. Further, text replace, which is often treated as a text insert plus a text delete, similarly suffers from these challenges if inserted and deleted characters are treated independently.

Representing text as a sequential array of characters is a common practice adopted while co-editing in a CRDT environment. This provides efficient co-editing and enables the co-editors to lazily synchronize to reach the same state.

However, synchronization is performed by accepting one change and discarding any conflicting ones. All operations are ordered (e.g., using a global clock in peer-to-peer setups and server timestamp in server-client setups) and typically the latest one is accepted, and all other conflicting ones are dropped. While this acceptable for some kinds of edits like color change, it is not acceptable for text where a true non-interleaving lossless merge of data (from all parties) is expected. Thus, a method that retains the simplicity of array accesses and still produces the expected merge is desired.

Embodiments use compound nodes in an improved fractional indexing system which allows for changes to text to be efficiently synchronized globally across all client devices. Fractional indexing allows for new nodes to be inserted between existing nodes, without altering pre-existing global indices. This enables a consistent view of nodes to be maintained by each co-editor. In particular, embodiments enable efficient co-editing of large CRDT arrays using forest data structures with compound nodes. The forest data structure includes one or more trees, such as Stern-Brocot trees, to implement the fractional indexing system.

To reduce the overall memory footprint of the indexing system, the forest data structure is sparse. This means that nodes do not need to be created for all text characters. For example, the initial state of the text data being co-edited is not explicitly represented as part of the data structure. Instead, the nodes of the trees represent changes to the text content. Additionally, rather than assigning each text character a new node in a tree, text data can be represented in compound nodes. For example, users often add text in bursts (e.g., while typing, cutting and pasting, etc.). When a burst of text data is received, the entire text content of that burst is represented by a single compound node. This allows for each burst of text to managed atomically and transferred as a whole to each co-editor. This improves the performance of these updates and also prevents interleaving that may occur in prior systems.

A compound node (also referred to as a batch node) represents multiple text characters. This allows the compound nodes to represent burst typing efficiently. Additionally, global indices are reserved, though not explicitly assigned, for all of the characters associated with a compound node. This further allows for changes to be made to characters represented within a compound node without introducing errors or other inconsistencies between co-editors. For example, if changes are later made to the text represented by the compound node, then the reserved indexes can be used for those changes, without requiring any changes to any already existing child nodes, which could result in inconsistent indexes across co-editors and lead to errors. This keeps global indexes consistent as further changes are made, improving the stability of the co-editing management system.

Embodiments allow for text changes to be handled efficiently across many co-editors. By batching bursts of changes, each character does not need to be individually indexed. Such explicit indexing, as is required in prior techniques, is resource intensive, particularly for large changes to text data. For example, separately indexing every character of a large text insertion requires significant memory and bandwidth resources to store and transfer the changes between co-editors. However, in accordance with various embodiments, such a large text insertion is represented by a single compound node, which does not lead to any resource or other performance issues. Further, global indices associated with the characters represented by a compound node are reserved. This improves the overall stability of the text data, reducing or eliminating the risk of conflicts that cause one user's text to become out of sync with co-editors. Additionally, batching changes allows for the changes to be synchronized atomically, preventing erroneous insertion of one user's changes within another user's changes when the same portion of the document is being edited.

FIG. 1 illustrates a diagram of a process of co-editing management using compound nodes in accordance with one or more embodiments. As shown in FIG. 1, digital design system 100 includes a co-editing management system 102. The digital design system 100 can be implemented as an image processing application, digital visual effect application, desktop publishing application, vector graphics editor, user interface design application, or other digital design application which enables concurrent co-editing of documents that include at least text data. The co-editing management system 102 manages changes made by the user and the co-editors to ensure that the changes by one user are consistently applied to the document being edited by other users. Likewise, changes received from other co-editors are first processed by the co-editing management system to ensure they are accurately applied to the co-edited document.

As shown in FIG. 1, a user provides an input 104 to the digital design system 100, at numeral 1. The input varies depending on the type of digital design system 100 and the document being co-edited. For example, the input may include the addition, deletion, replacement, movement, or otherwise change in text content of the co-edited document. The co-edited document may include only text data or may be a mixed document that includes text data and other types of data, such as image data, vector graphics data, etc.

The input 104 is received by a user interface manager 106 which then applies changes to the co-edited document 108 based on the input 104. At the same time, the user interface manager 106 sends a message to co-editing management system 102, at numeral 2, notifying the co-editing management system of the received change. The notification is received by an input listener 110. At numeral 3, the input listener 110 determines whether the input is relevant for co-editing purposes. For example, the input may include changing the magnification of the view of the co-edited document 108 or other inputs that do not modify any objects, such as Bezier paths, text data, etc. of the co-edited document. Such inputs can be ignored. However, if the input 104 results in a change to an object of the co-edited document, then details of the change need to be propagated to other co-editors.

In some embodiments, input listener 110 determines a type of input, such as text input, drawing input, etc. Text inputs change the current state of the text (e.g., by adding, removing, moving, replacing, etc. text) and therefore need to be propagated to other clients. In the example of FIG. 1, when a text input is identified, it is passed to burst detector 112. At numeral 4, burst detector 112 identifies a "burst" of text. Text is often input as bursts, either through typing or through a copy-paste operation. As used herein, a burst refers to any collection of text inputs that are bounded by a start event and an end event. The burst detector 112 groups text characters together when the user is typing or when the user pastes content into the co-edited document 108. Various application-specific criteria can be used to detect and create these bursts. For example, a burst may start when typing (or other character input) is detected and end when a whitespace (e.g., a new line) character is typed. Alternatively, a burst may start when text input is detected and end when a pause greater than a threshold value is detected. Similarly, a burst may start when text is input and end when a disjoint action (e.g., a deletion after an insertion) is detected. In some embodiments, bursts align with the undo/redo behavior of the application. For example, one burst can be made the same size as the application would undo when user performs an undo action. Alternatively, applications that support very granular undo/redo operations (e.g., per character) may define bursts based on other events, as discussed above.

Once the burst detector 112 signals completion of a burst, it informs node manager 114 of the change. Node manager 114 determines which elements are associated with the change at numeral 5. For example, in a text application, the change may include adding, deleting, or replacing text in the document. Each character of the initial state of the text document corresponds to an element. If new text is added, then the node manager generates a compound node which references the adjacent elements. In some embodiments, the compound node takes the form of a Stern-Brocot tree. Stern-Brocot trees are a type of binary tree that maintain an index per node. In some embodiments, the Stern-Brocot tree maintains separate integral numerators and denominators per node. Alternatively, the Stern-Brocot tree maintains other representations of the index. For example, it may store the index as a matrix or array (e.g., storing multiple numerators and denominators), or it may store the index directly as a fraction or numerical value. The representation used may vary depending on the use case. The index of a new node inserted between any two given nodes is determined by adding the numerators from the two given nodes (e.g., the new node's ancestor nodes) to yield the numerator of the new node and adding the denominators from the ancestor nodes to yield the denominator of the new node. This provides an efficient way of representing a fractional index of a new node. Stern-Brocot trees are discussed in more detail below.

At numeral 6, the node manager 114 determines whether the forest data structure 116 includes a node associated with the change. As discussed further below, the state of the co-edited document 108 is represented using a two-tiered data structure. The initial state of the document is represented by a logical tier and changes to that initial state are represented by a physical tier. For example, indices for the initial characters of text do not need to be computed and stored. This follows from the sequential nature of text data from a first character to a last character (e.g., left to right, right to left, etc.). The indices of the characters of the initial state are implicit, and each co-editing client device can determine how to apply changes associated with these characters. However, if each editor changes their text, then each editor's local document has changed. When the other editor's changes are received, they may be misapplied, as the local indices may no longer align. As such, new nodes of the forest data structure are physically created to represent these changes. If the change necessitates a new node to be created, one is created using fractional indexing, such as by creating a new Stern-Brocot tree or adding to an existing Stern-Brocot tree. As discussed further below, the node manager 114 can create a compound node that represents the changes. The compound node represents all of the text that was changed in the burst and is associated with a unique, stable and permanent global index for the affected compound node.

At numeral 7, update manager 120 generates an update to be sent to all co-editing parties. The update is associated with the node that corresponds to the change, such as a compound node that represents all of the changes associated with a burst. For example, a change that inserts text includes a compound node representing the new text at a global index where the text was inserted. At numeral 8, the global index and the text change are then sent as co-editing output 122. For example, the co-editing output 118 can be sent to a co-editing server which then distributes the change to all co-editors. Each co-editor receives the update and consults its Stern-Brocot forest to find local sequential index for the received global index. The local Stern-Brocot forest and actual text are then updated on the remote co-editor to reflect the change.

Figure 2:
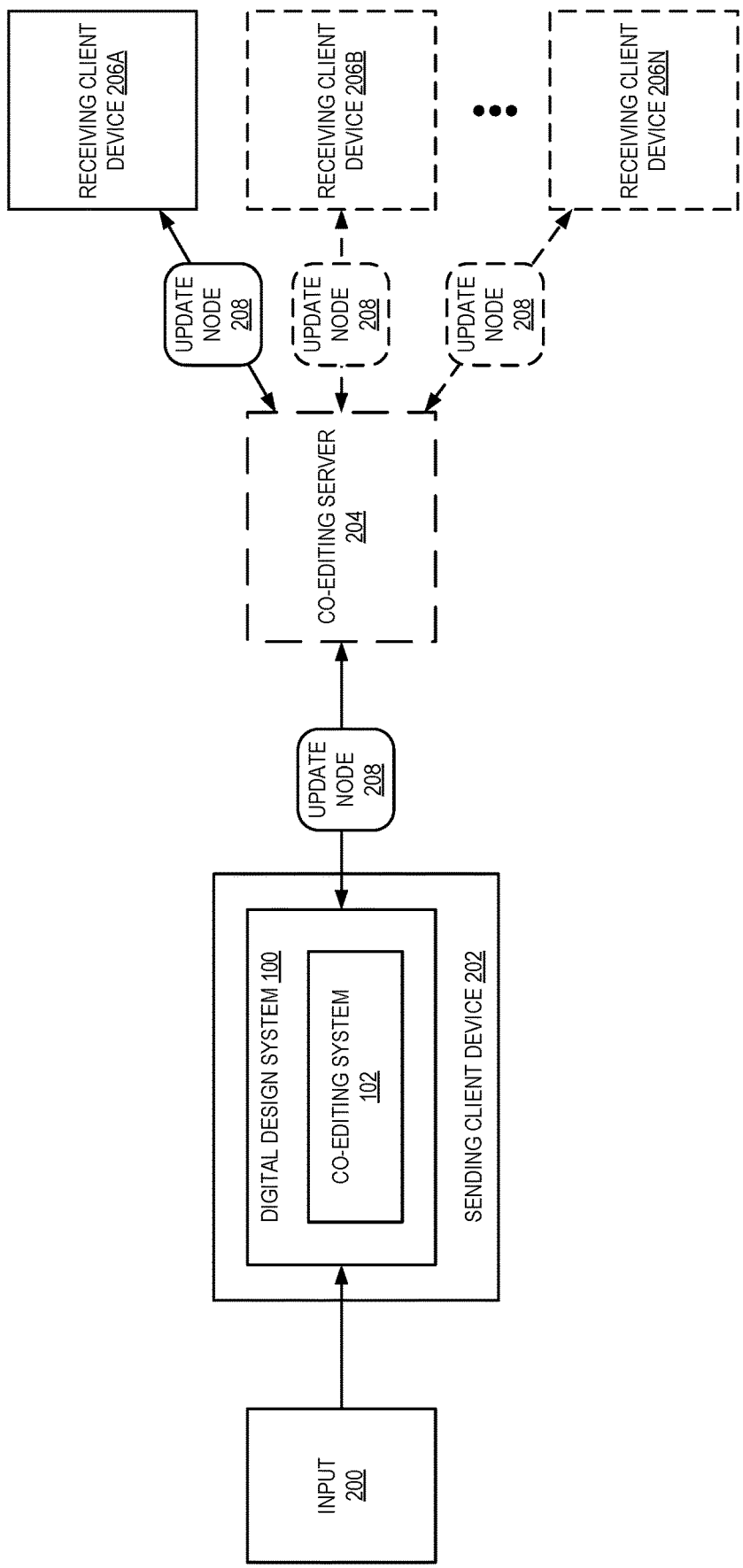
FIG. 2 illustrates a diagram of an environment for co-editing images in accordance with one or more embodiments.

FIG. 2 illustrates a diagram of an environment for co-editing documents in accordance with one or more embodiments. As shown in FIG. 2, an input 200 is received by digital design system 100. In the example of FIG. 2, digital design system 100 is implemented on a client device 202. The client device 202 is used by one co-editor to manipulate a co-edited document. As discussed, the input may include one or more changes to be made to a co-edited document.

Co-editing management system 102 then generates an appropriate update that reflects the changes and includes a global index that is usable by all co-editing parties to accurately apply the changes to their own copies of the co-edited document. For example, update node 208 may be a compound node that represents a burst of changes receives as input 200. In some embodiments, the update node 208 is sent directly to co-editors (e.g., receiving client devices 206A-N. Alternatively, in some embodiments, this update node 208 is sent by the digital design system 100 on sending client device 202 to a co-editing server 204. Co-editing server 204 may include a server associated with the digital design system 100. For example, the digital design system may use a co-editing service provided by, e.g., the developer of the digital design system 100. Additionally, or alternatively, the co-editing server 204 may be provided by a third-party developer who provides a co-editing service that is compatible with the digital design system 100. In such instances, the co-editing server 204 may be provided using computer resources provided by the developer, third-party developer, or other entity, such as a cloud services provider. In some embodiments, the co-editing server may be maintained by an end user or organization (e.g., as an on-premises network) which enables the organization's employees, customers, etc. to access and collaborate on document generation. Alternatively, in some embodiments, co-editing may be performed in a server-less peer-to-peer environment. Because there is no server to provide a global order to the updates from multiple clients, in a peer-to-peer system one can use one of the several kinds of global clocks (vector clocks, Lamport timestamps, matrix clocks, version vector, etc.) to establish a unique order of operations.

In each case, the update from one client (e.g., sending client device 202) is distributed to all co-editors (e.g., receiving client devices 206A-206N). Each client device 206A-206N includes its own digital design system, local copy of the document being co-edited and local copy of a Stern-Brocot Forest representing the text of the co-edited document. The changes are applied locally, using the global index, which ensures that each copy is updated consistently. In some embodiments, co-editing server 204 maintains its own copy of the document being co-edited. This may be a primary copy of the document and the local copies maintained by each client device may be secondary copies.

In some embodiments, the co-editing server 204 is responsible for initiating periodic atomic resets of the document state. For example, the co-editing server 204 obtains a lock on the document and instructs each client device to update its forest data structure to reflect the new state. As discussed further below, this allows the physical tier to be cleared, as the new initial state of the document is represented in the logical tier. Subsequent changes then result in new physical indices being determined and added to the physical tier. Atomic resets may be performed after a specific amount of time has passed, when an editor opens or closes the document, based on a size of the data structure, upon request by one or more of the clients, or other conditions. Alternatively, the state may be reset without a co-editing server through a distributed reset system in which state is synchronized across the clients.

In some embodiments, co-editing server 204 is also responsible for conflict resolution. A conflict arises when two independent co-editing parties with the same current local view insert an element at the same local sequential index. In this case, both parties compute the same global index for their insertion and send their operation to the co-editing server. The server determines an order of execution (often in the order of arrival of operations at the server) for these operations and broadcasts them in that order. This establishes a consistent global order of execution of operations on all co-editing parties, which now must adhere (by making local changes sometimes) to achieve an eventually consistent state everywhere. Among the parties where these operations originated, one of them sees its local operation consistent with the first operation in the global ordering established by the server. The other party, however, receives a different first operation and hence concludes a conflict. Thus, it must adapt by assigning the global index to the server's chosen operation. For the operation chosen by the server to execute second, both parties (and all others in the system) already have the desired global index already consumed on their end. Thus, they make the element insertion in a predefined manner (e.g., either to the left or to the right of the conflicting insertion made by the first operation) to obtain a new global index (consistent on all co-editing parties) and resolve the conflict. Conflicts associated with other operations, such as element deletion or reordering may be handled similarly. Alternatively, different methods of conflict resolution may be employed as are known in the art.

Figure 3:
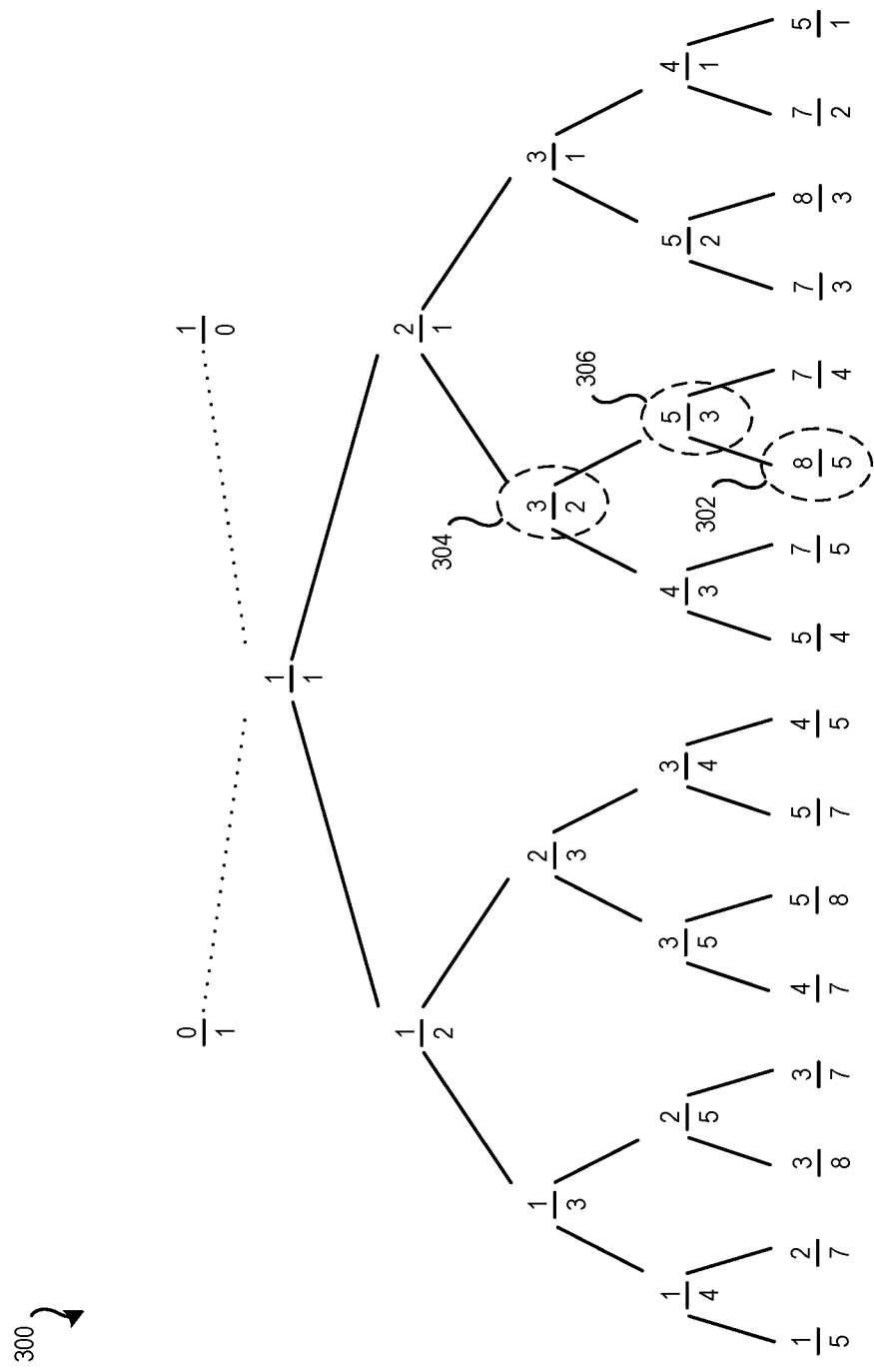
FIG. 3 illustrates an example of a Stern-Brocot tree.

FIG. 3 illustrates an example of a Stern-Brocot tree. Embodiments use Stern-Brocot trees to represent fractional indexes. This allows for both no index initialization for sequentially indexed arrays, such as text data, and new indices are simple to represent using floating point numbers. Fractional indexing bisects indices of a previous element and a next element to insert a new element in-between. This causes a quick consumption of precision (as every new insertion increases significant digits by 1). A Stern-Brocot tree is a binary tree that maintains separate integral numerators and denominators per node (and not their division result). Insertion of a new node in-between any two given nodes requires the addition of the numerators (from the two ancestor elements) to yield numerator of the new element, and addition of the denominators (from the two ancestor elements) to yield denominator of the new element. The final fractional index of an element is obtained by dividing its numerator by its denominator.

An example Stern-Brocot tree 300 is shown in FIG. 3. However, just using a Stern-Brocot tree alone can address the precision issues of traditional fractional indexing but introduces its own issues. For example, each element must maintain its own fractional index. Additionally, although one node is the new node's immediate parent, the other node requires walking the tree to identify, which incurs performance costs. As shown in FIG. 3, if a new element 302 is added, then to determine the numerator and denominator of the new element, the new element needs access to the Stern-Brocot element just to the left of it 304 and just to the right of it 306. Element 306 is the immediate parent of the new element 302, but additional traversal of the tree is required to identify element 304. Additionally, in conventional Stern-Brocot trees, all nodes are stored in memory. This can lead to a significant memory footprint being required to represent the entire initial state of the text data. To address both the shortcomings of conventional fractional indexing and the use of Stern-Brocot trees, embodiments use a Stern-Brocot forest, as described below.

Figure 4:
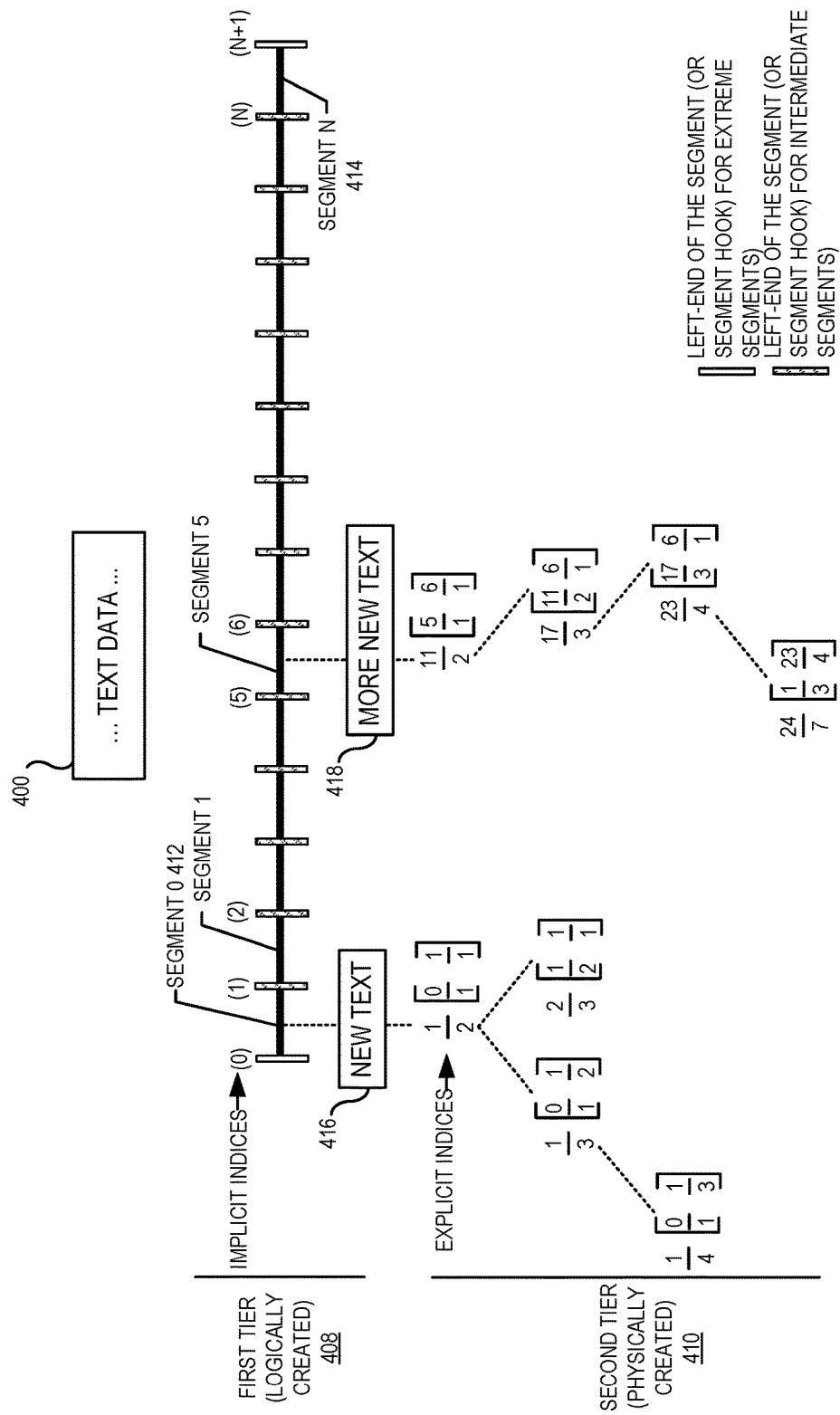
FIG. 4 illustrates an example of a Stern-Brocot forest, in accordance with one or more embodiments.

FIG. 4 illustrates an example of a Stern-Brocot forest, in accordance with one or more embodiments. Embodiments provide a two-tiered Stern-Brocot forest to represent text data in a document. Although embodiments are discussed with respect to text data, embodiments are similarly applicable to any structure that can be represented as a sequential array of indices. At startup, or other initial state, a document includes text data 400. Each character of the text data is implicitly indexed as part of the first tier 408 which is logically created (e.g., explicit indexes are not assigned and stored for each character). Implicitly, the characters of the text data 400 start at the first character and end at the last character. Knowing this initial state, a first tier 408 is logically created which starts at index 0 (e.g., an index prior to the first character) and ends at index N+1 (e.g., an index after the last character). By adding an implicit index before and after the first and last characters, any new text added before or after the initial state of the text data 400 can be represented using Stern-Brocot trees. Because this tier is logical, it provides a low overhead solution. There is no need to explicitly assign an index to each element as each initial index is implicitly generated.

The first tier 408 remains active from document open time, until an operation on the text data causes a change in the text data. These operations may include adding text, deleting text, or replacing text. All other operations, like changing the color, line weight, or other properties of the text do not affect the ordering of the text characters, and thus the system remains in first tier. Once a text change operation happens, nodes are created and added to a second tier 410 that is physically created in memory.

As shown, the physical tier represents the newly inserted or deleted text data which are explicitly maintained in Stern-Brocot trees, while fractional indices for rest of the anchors in the path remain implicitly available (i.e., without any explicit memory consumption). Periodically, a reset can be carried out atomically across all connected co-editing parties where the state of all or some of the text data in the document are reset. This moves all of the current text data to the first tier, allowing for the physical tier to be cleared, freeing up the memory that it previously consumed. In some embodiments, all text data in a given document is represented by the same Sparse Stern-Brocot Forest. Alternatively, distinct sections of text are represented by different forests. For example, the text in a first text box may be associated with a first forest, while the text in a second text box may be associated with a second forest.

Text data with N initial characters (e.g., at document open) has fixed initial fractional indices. An example is index 1 for the first character, index 2 for the second, index 3 for the third, and so on. Since these are determinable with a simple fixed mathematical formula, there is no need to explicitly store them. If a text update needs a fractional index for one of these initial anchors, it can be directly determined with this formula and returned. In the first tier

408, fractional indices of all characters work with this simple mechanism. As such, no system resources are needed to explicitly store the indices, nor are there any added costs of string representation, communication, and comparison as with conventional fractional indices discussed above.

As shown in FIG. 4, between any given pair of indices is a segment which refers to the possible range of fractional indices that may exist between that pair of indices (e.g., characters). Thus, for N initial characters, there are n−1 segments in between. In addition, two additional segments—one before the first character and one after the last character. In the example of FIG. 4, these are shown as Segment 0 412 and Segment N 414. These additional segments are required to handle text insertions (and deletions) at the start and end of the text data. When new text is inserted or deleted, a new Stern-Brocot tree is created to represent changes in that segment (if one does not exist).

Text data is often inserted in bursts, either due to the typing cadence of the user or through copy-paste operations of text data. As discussed, embodiments use a burst detector to determine when a user finishes entering a burst of text. The detector can trigger a burst end event when user takes a momentary pause while typing, when the location of insertion of the text changes, when user starts to delete after a few insertions, etc. Once a burst input is identified, a compound node is created to represent the change. A global index is determined for this compound node based on the local index of where the burst was input. In some embodiments, it is not required to maintain the text content data inside the compound nodes. Instead, the compound nodes are used to convert local indices to global indices and back. This means applications can retain their existing storage as the single source of truth for data. The global index of the compound node is used to inform and replicate the user action at all other co-editing sites (e.g., other co-editing clients).

Since a compound node is communicated as a single indivisible entity to all co-editors, it is not merged with insertions from any other co-editors. This prevents one user's changes from being interleaved with another user's changes. Additionally, there are no limits to the size of a compound node, it can be used to represent a large quantity of text being pasted into a document or a short burst of typing. Keeping one global index for the entire compound node means that that index stands for all characters represented by the compound node. This means that any further change at some character location inside the compound node cannot be precisely communicated to other co-editors and would lead to a breakdown of eventual consistency. To alleviate this problem, embodiments store the number of characters represented by a compound node as one of its data members. This allows the system to determine and assign (on demand) unique global indices to every character inside the node using constant time O(1) computations. As discussed further, the characters in a compound node are logically arranged in a strict order—every successive character is assumed to be the right descendant of the preceding one (had this been a fully expanded tree). For example, a compound node representing 'go' can assign a unique global index to 'o' such that it is same as it would have got if 'o' were the right child of node 'g' in a non-compound setup.

Based on the properties of the compound nodes, normal insertions and deletion operations in the tree are modified. If a new node gets inserted past a compound node, its global index is generated leaving room for all characters inside the compound node. If a character is inserted or deleted in the middle of a compound node, it is broken down into two (possibly compound) nodes in such a way that any further children are not affected, and their existing global indices remain stable and unchanged. This requires orchestration of the tree as discussed further below, as without this, newly inserted characters would affect global indices of compound node's existing children.

Replacement of a text of n characters with a new text of m characters is treated as an atomic operation (to avoid interleaving). It can be implemented as a deletion of n characters followed by insertion of m, or vice-versa but it is atomic in the sense that no third operation (e.g., from other co-editors) can come in-between these two. Note that a deletion operation (e.g., with replacement or otherwise) can span multiple compound nodes (partially or fully).

Creation of a compound node requires multiple inputs from the user (e.g., burst typing of characters, copy-paste of large number of characters, etc.). However, a burst is not instant, and it takes time to be generated. During the time that the burst is being received, and compound node is being generated based on the burst, it is possible for a remote burst. The remote burst will need to be acknowledged and applied prior to the local one as it has already been sent to all co-editors. To handle this, the local burst is completely managed inside burst detector and it does not influence Sparse Stern-Brocot Forest in any way until the burst is complete at which point a compound node is created, global index is assigned to the first character and reserved for others, and communication to other co-editors gets outbound.

This means that if new text is added at X different locations, then X new Stern-Brocot trees (each with one node) are created. In the example of FIG. 4, new text 416 is added at segment 0 (e.g., before the start of text data 400). This new text 416 is associated with a compound node of a new Stern-Brocot tree with an index of ½. Likewise, more new text 418 is added at segment 5, within the text data 400, leading to a separate Stern-Brocot tree having an index of 1½ associated with a compound node that includes the more new text data 418. If, however, the new text 416 or more new text 418 is itself added, then their respective Stern-Brocot trees are updated with new nodes. How the Stern-Brocot trees are updated with new nodes based on changes to the text data is discussed in more detail below.

Once a second tier has been created, it remains in that state until an atomic reset is performed across clients. An application might choose to maintain the second tier, or it can perform an atomic reset. The atomic reset can be triggered in a variety of ways. For example, an atomic reset may be performed periodically, after a fixed number of changes have happened, after the memory consumption of the second tier reaches a threshold value, or other reset condition. For example, in some rare cases a Stern-Brocot tree can reach a state at which new elements cannot be inserted. If such a state is detected, then an atomic reset can be automatically triggered. Once an atomic reset is performed, the second tier of the path is deleted, freeing the previously consumed memory and the text data is instead only represented via the first tier. The state after atomic reset is akin to document open. The reset needs to be performed atomically across clients without any intervening forest accesses or updates. In other words, all co-editing parties must collectively move to first tier, ensuring that all co-editing parties have a shared state following the atomic reset.

FIG. 4 shows an example of the forest data structure that is used for co-editing a sequential array (such as text data) with N elements (e.g., anchors) at the start (e.g., when the document is opened or following an atomic reset). At this stage, all co-editing parties have the same understanding (and thus the same local view) of array element indices. Thus, sequential array indices can themselves serve as global communication indices. Using this feature of sequential arrays, embodiments ensure that these initial indices remain stable and unaffected by any new insertions or deletions of elements.

The indices determined using the Stern-Brocot trees are used to convert from a local index to a global index. In some embodiments, the initial global indices may not match the sequential array indices. For example, a mapping may exist between the global indices and the array indices:

$$G_i = (L_i + O) * C \ \ 0 \leq i \leq n, \ L_i = i$$

where, $G_i$ and $L_i$ respectively are the global index and local index of array element 1. O is an offset, and C is a measure of the gap between any two initial successive global indices. Both O and C are constants. In the example shown in FIG. 4, both O and C are 1, though other values may be used depending on implementation.

As discussed, the range of real numbers between any two initial implicit indices is referred to as a segment. For N array elements, one can insert new elements before the first element (e.g., local sequential index 0) or after the last element (e.g., local sequential index n−1), or anywhere else in-between any two elements. Thus, at most n+1 segments are needed to represent insertions anywhere in the array. Since segment 0 and segment N are extremes and need to be available to allow for inserting a new first or last element, global indices 0 and n+1 are not assigned to any element of the array (e.g., text data, etc.). All global indices always strictly lie inside the range (0, n+1). Any new insertions or deletions are handled inside these segments. An independent Stern-Brocot tree is created for every segment, when a first element is inserted, or deleted, in the segment.

Figure 5A:
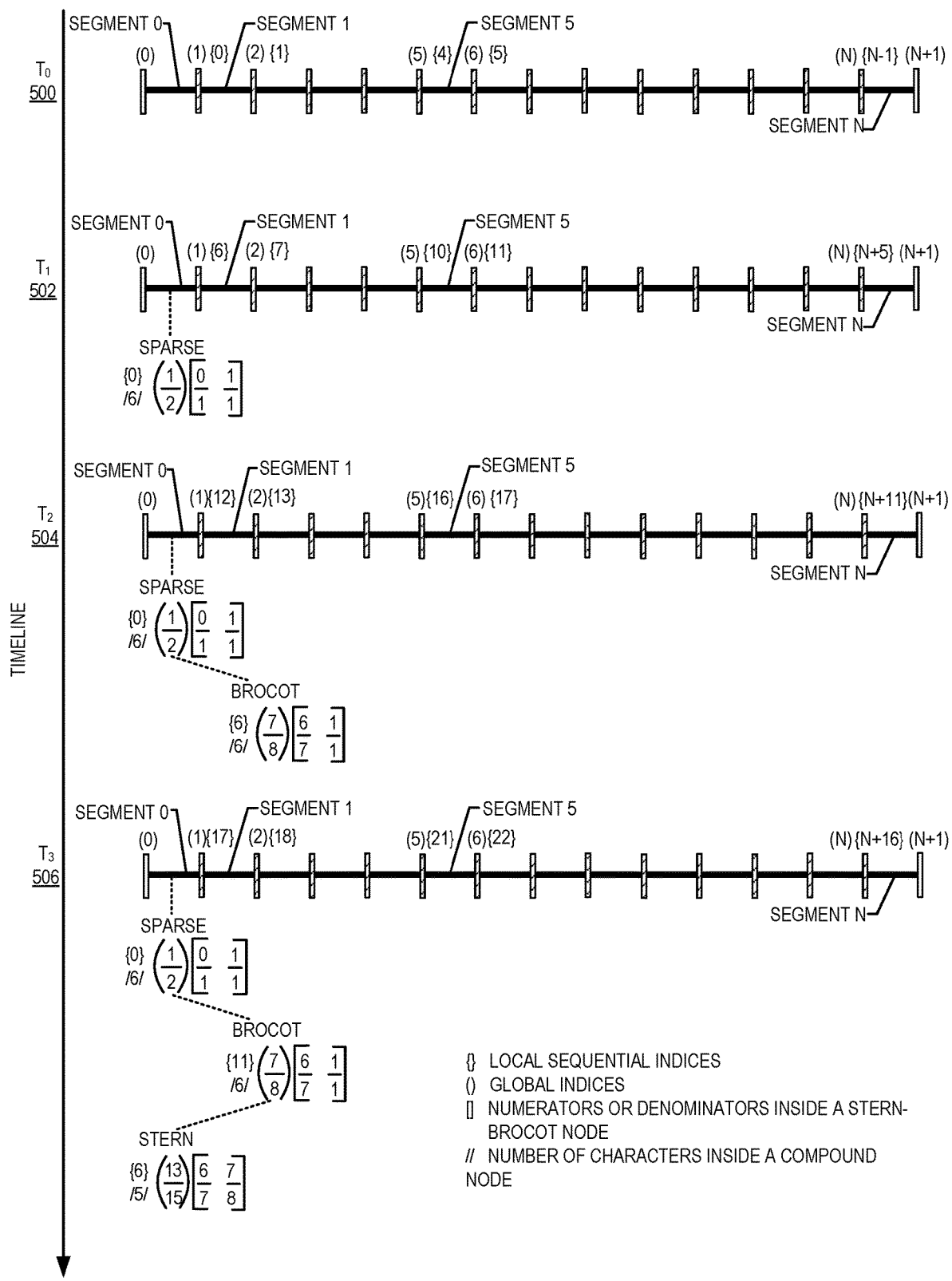
FIGS. 5A-5B illustrate an example of using a Stern-Brocot forest with compound nodes to manage changes to a co-edited document, in accordance with one or more embodiments.
Figure 5B:
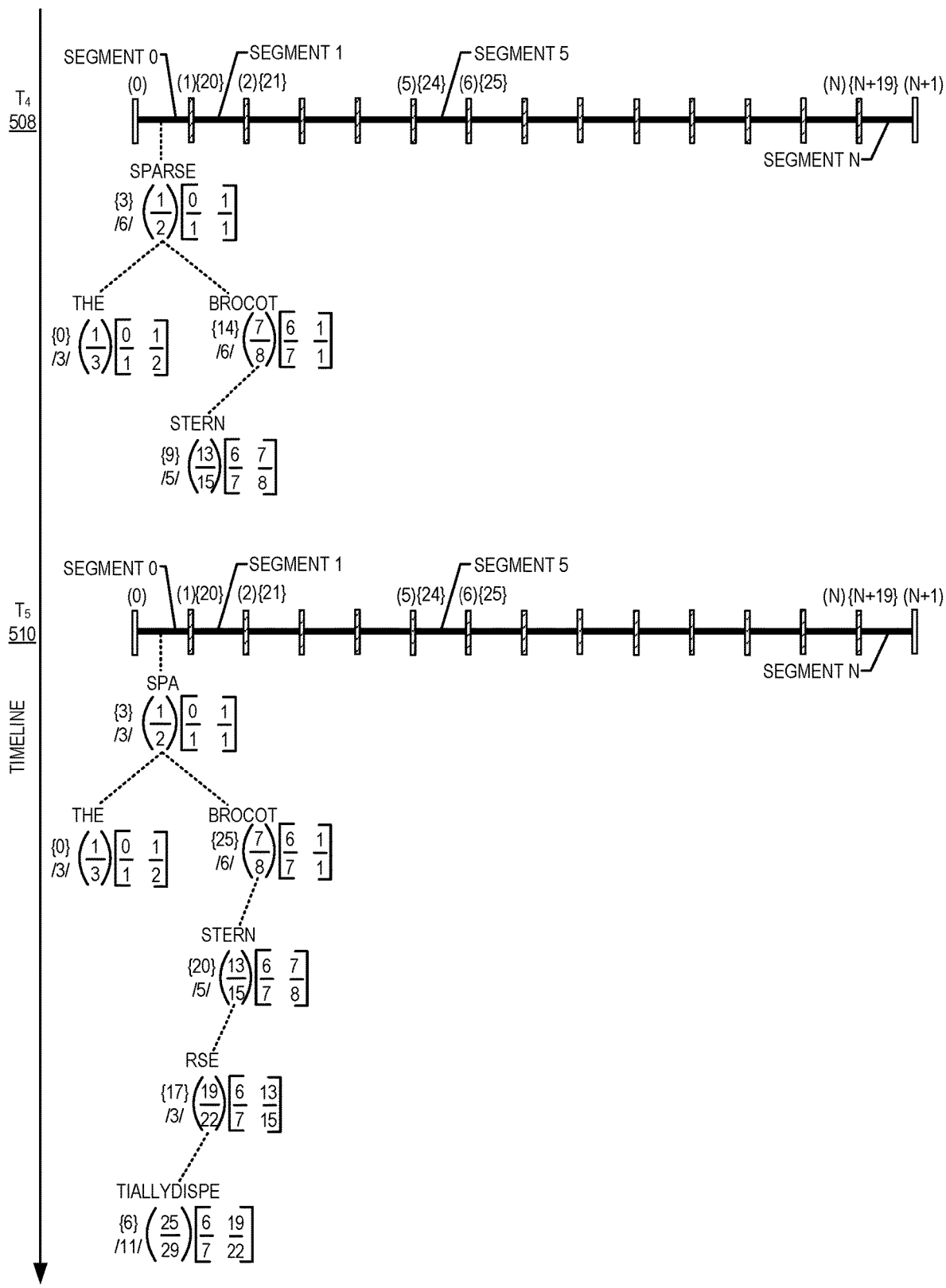

FIGS. 5A-5B illustrate an example of using a Stern-Brocot forest with compound nodes to manage changes to a co-edited document, in accordance with one or more embodiments. When a new element is inserted by one of the co-editing parties at local sequential index i, the co-editing management system needs to locate the segment associated with the insertion to determine whether a new Stern-Brocot tree is to be created or to determine where to place the new element in an existing Stern-Brocot tree associated with that segment. To identify the segment, the co-editing management system scans the forest left to right counting the number of implicit and explicit indices currently consumed in the forest and finds the segment which currently holds sequential index i. Alternatively, this information may be cached, to avoid having to scan the forest to identify the segment. In some embodiments, the implicit index just before a segment (also referred to as a segment hook) belongs to the segment, and the implicit index just after the segment is not a part of this segment (e.g., it belongs to the next segment). In other words, segment 1 includes implicit index 1, segment 2 includes implicit index 2, and segment N includes implicit index N. Implicit indices 0 and N+1 do not belong to any segment.

Initially, all co-editors have the same view of the text to be co-edited. It could be empty (e.g., no text) or any amount of text. In the example of FIG. 5, the initial state $T_0$ 500 includes some amount of text. Each character of the initial state of text is associated with an index from global index 1 corresponding to the first character of the text to global index N corresponding to the last character of the text. At the initial state, local sequential indices (depicted inside curly braces) of array elements vary from 0 to N−1, and their corresponding global indices (depicted inside parenthesis) vary from 1 to N. At this initial state, the forest only has the logical first tier, as no changes have yet been made to the text, and the characters are implicitly indexed which does not require any memory storage.

At time $T_1$ 502 a co-editor now types the word 'Sparse' at the beginning of this text (e.g., prior to the first character of the initial text). As discussed, a burst detector identifies the input of 'Sparse' and a compound node is generated to represent the new text. The new compound node now acquires local index 0 and the existing local indices are displaced based on the length of text associated with the compound node. In this instance, there are six characters added, therefore the local indices following the insertion are incremented by six. The local index of the compound node also corresponds to the local index of the first character, 'S,' of the text corresponding to the compound node. The co-editing management system first locates segment 0, which is the segment to which current sequential index 0 belongs. Since this segment does not have any existing Stern-Brocot tree, a new one is created, and the new compound node becomes the root of the new tree.

The segment associated with the new compound node is identified as segment 0 and a global index is determined. In this case, the left parent node's index is 0/1, and the right parent node's index is 1/1, resulting in a new global index of 1/2 for the new compound node. The global index for the new compound node is communicated to other co-editors and is the global index of first character in the compound node. In addition to the global index, the length of compound node is also communicated. In some embodiments, the length is explicitly communicated as a property of the node. Alternatively, the length is inferred from the actual text data that has been added. As such, when the node, global index, and new text data are sent to each co-editor, the co-editing management systems identify the number of characters in the new text data as the length of the compound node. As shown at time $T_1$ 502, insertion of a compound node only changes the local indices of other characters in the text, but their global indices remain the same. Therefore, any in-flight operations that reference these characters remain valid and can be applied to the correct characters despite addition of the new node.

The four numbers in square brackets against every Stern-Brocot node are numerators and denominators of the left and right ancestors of the node. As discussed, every Stern-Brocot node is created from two ancestors (e.g., one that immediately lies to the left of the node on the number line, and the other that lies immediately to the right on the number line). Numerators of these two nodes can be added to get the numerator of the child, and denominators of these two ancestors can be added to obtain the denominator of the child. Dividing the child's numerator by its denominator yields its unique global index. The problem with this setup is that one needs to explicitly travel the tree (up the parent hierarchy) and find the nodes lying immediately to the left and right of the location where the new node is getting inserted. While this is not very expensive and an O(log n) traversal can manage this, there exists another way. For example, one can carry the numerators and denominators of ancestors down the tree and maintain them at every tree node. This way, when a new node needs to be created there is no need of locating ancestors as their numerators and denominators are already known. This requires maintaining four integral numbers (left numerator, left denominator, right numerator, and right denominator) at every Stern- Brocot node. For creating the root node of the Stern-Brocot tree in segment i, these numbers are assigned as follows:

Left Numerator=$G_{i+1}$
Left Denominator=1
Right Numerator=$G_i$
Right Denominator=1 where, $G_i$ and $G_{i+1}$ are the global indices. As more nodes are created down the tree, inserting a node to the left of a parent node inherits its right numerator and right denominator from the parent. The left numerator becomes the sum of left and right numerators of the parent, while the left denominator becomes the sum of the left and right denominators of the parent. For inserting a right child, its left numerator and left denominator are copied from the parent node, while its right numerator is the sum of both numerators of the parent and its right denominator is the sum of both denominators of the parent. In some embodiments, alternative conventions may be implemented. For example, without loss of generality, one can swap what is stored in left and right numerators and denominators.

Note that since every node now carries information of its ancestors, to find the global numerator of a node one needs to add the two ancestral numerators stored in it and the same for denominators. For example, the node inserted at time $T_1$ 502 has its numerator given by 1+0 (e.g., 1) and denominator given by 1+1 (e.g., 2). This makes the global index of this node 1/2, as shown in FIG. 5A. Global indices may be stored as matrices or as floating-point values, depending on implementation.

As discussed, inserting a new node requires first locating the correct segment. This is achieved by a linear O(n) walk over the segments until the desired segment is reached and maintaining a sum of the count of implicit indices and the nodes inside Stern-Brocot trees encountered thus far. In some embodiments, this search can be optimized by maintaining a running count (or by using other search indexing techniques) up to every segment and doing a binary search or by maintaining hashes or other secondary data structures.

Next, the co-editor types a subsequent burst (e.g., 'Brocot') after 'Sparse', leading to the state at time $T_2$ 504. The same procedure repeats, but this time the Stern-Brocot tree for the segment already exists and thus a new node is created in the tree. Since any Stern-Brocot tree is also a normal binary tree, the location of a new node in the tree is identified by going left (if the new element is being inserted before the existing element) or right (if the new element is being inserted after the existing element) of every parent node (starting with tree's root) until no further nodes are identified. Insertion, deletion, and access cost in a Stern-Brocot tree is O(log n), just like any other binary tree. As before, the burst detector identifies the input burst corresponding to 'Brocot' and creates a compound node representing it. This is then added as a right child from the compound node representing 'Sparse' in the Stern-Brocot tree that was created for segment 0. However, the global index assigned to the new 'Brocot' node needs to leave room for individually assigning global indices to all characters in text 'Sparse', if needed. As a result, the left parent node's index is 6/7 for the 'e' character from the ' Sparse' compound node, and the right parent node's index is 1/1 corresponding to node 1, resulting in a new global index of 7/8 for the new 'Brocot' compound node.

At time $T_3$ 506, the word 'Stern' is inserted between 'Sparse' and 'Brocot'. The input is identified as discussed using a burst detector and a compound node is generated. Next the placement of this newly inserted compound node needs to be determined. This presents a challenge, as updating the tree to reflect the new order (e.g., the Brocot node becomes the right child of the Stern node, which is itself the right child of the Sparse node) would disturb the existing global index of node 'Brocot'. That would cause any in-flight operations on characters inside the compound node 'Brocot' or any node under its subtree to be applied to the wrong node and eventually cause the consistency guarantee of the system to fail. Instead, embodiments make the new compound node 'Stern' the left child of 'Brocot'. This does not change sequential text ordering as left children appear before the parent in inorder traversal order of Stern-Brocot trees. In general, had there been a subtree under the 'Brocot' compound node, then the 'Stern' compound node would get added as the last node found by traversing left child links of all nodes beginning with the 'Stern' compound node.

As shown in FIG. 5B, at time $T_4$ 508, new text 'The' is inserted to the left of the text 'Sparse'. A new compound node is created and inserted as the left child of the 'Sparse' compound node. Because 'The' is now the first text in the document, the local index of the 'The' compound node is made 0 and the rest of the compound nodes are adjusted by three, to account for the added characters. At time $T_5$, the co-editor changed the word 'Sparse' to 'SpatiallyDisperse' by inserting the text 'tiallyDispe' after local sequential index 5 (e.g., after character 'a' of 'Sparse'). This operation requires splitting the compound node for 'Sparse' into two compound nodes and creating a new compound node for the entered text. In particular, the compound node for 'Sparse' is updated to correspond to 'Spa' and the length of the compound node is updated to three. A new compound node corresponding to 'rse' is then created as the left child of the 'Stern' compound node. Thus, when the Stern-Brocot tree is read, 'Spa' and rse' remain in order without disturbing the global indices for the other nodes of the tree. Similarly, the new compound node corresponding to 'tiallyDispe' is added as the left child of the 'rse' compound node. When read, the text of the three nodes will read 'SpatiallyDisperse' and all other nodes' global indices will remain unchanged.

Figure 6:
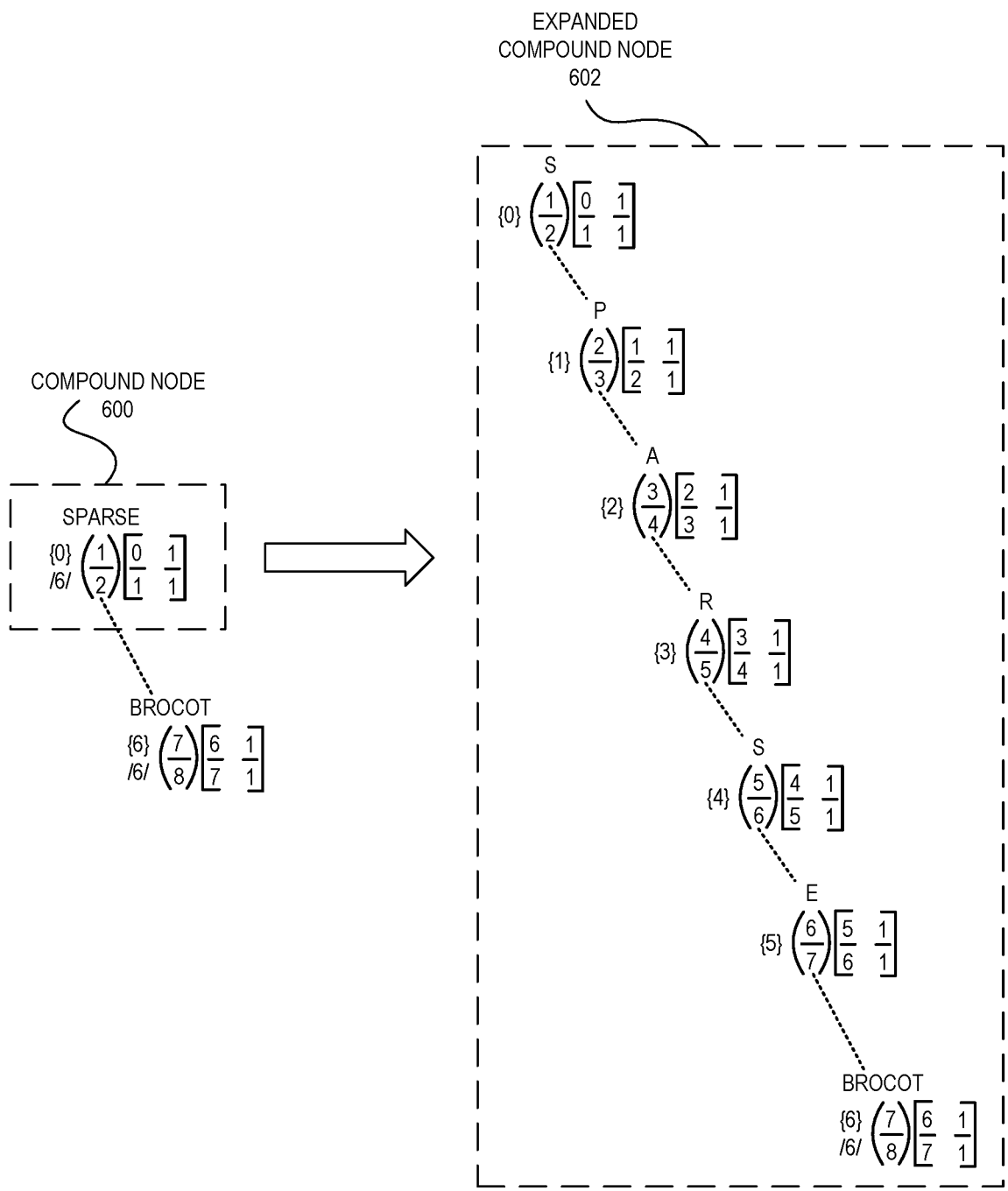
FIG. 6 illustrates an example of a compound node, in accordance with one or more embodiments.

FIG. 6 illustrates an example of a compound node, in accordance with one or more embodiments. As discussed, a compound node is associated with multiple characters and indicates its length. Using the compound node for 'Sparse' 600, this can be expanded as shown in expanded compound node 602. For a given compound node, the index of the compound node corresponds to the first character of the text associated with the compound node, and indices are reserved for the other characters. For example, the index 1/2 of compound node 600 corresponds to the compound node itself and to character 'S' of 'Sparse.' As shown in expanded compound node 602, each remaining character has a reserved index as though each character is a right child of the preceding character.

The global index of ith character inside a compound node (e.g., its numerators and denominators), can be determined using the following equations. As usual, the sum of the left and right numerators when divided by the sum of the left and right denominators yields the global index.

$$LN_i = LN_0$$

$$LD_i = LD_0$$

$$RN_i = i*LN_0 + RN_0$$

$$RD_i = i*LD_0 + RD_0$$

where, $LN_i$, $LD_i$, $RN_i$, and $RD_i$ respectively are the left numerator, left denominator, right numerator, and right denominator of ith character inside the compound node. $LN_0$, $LD_0$, $RN_0$, and $RD_0$ are the numerators and denominators of the first character inside the compound node and thus are also the numerators and denominators of the compound node itself.

Figure 7A:
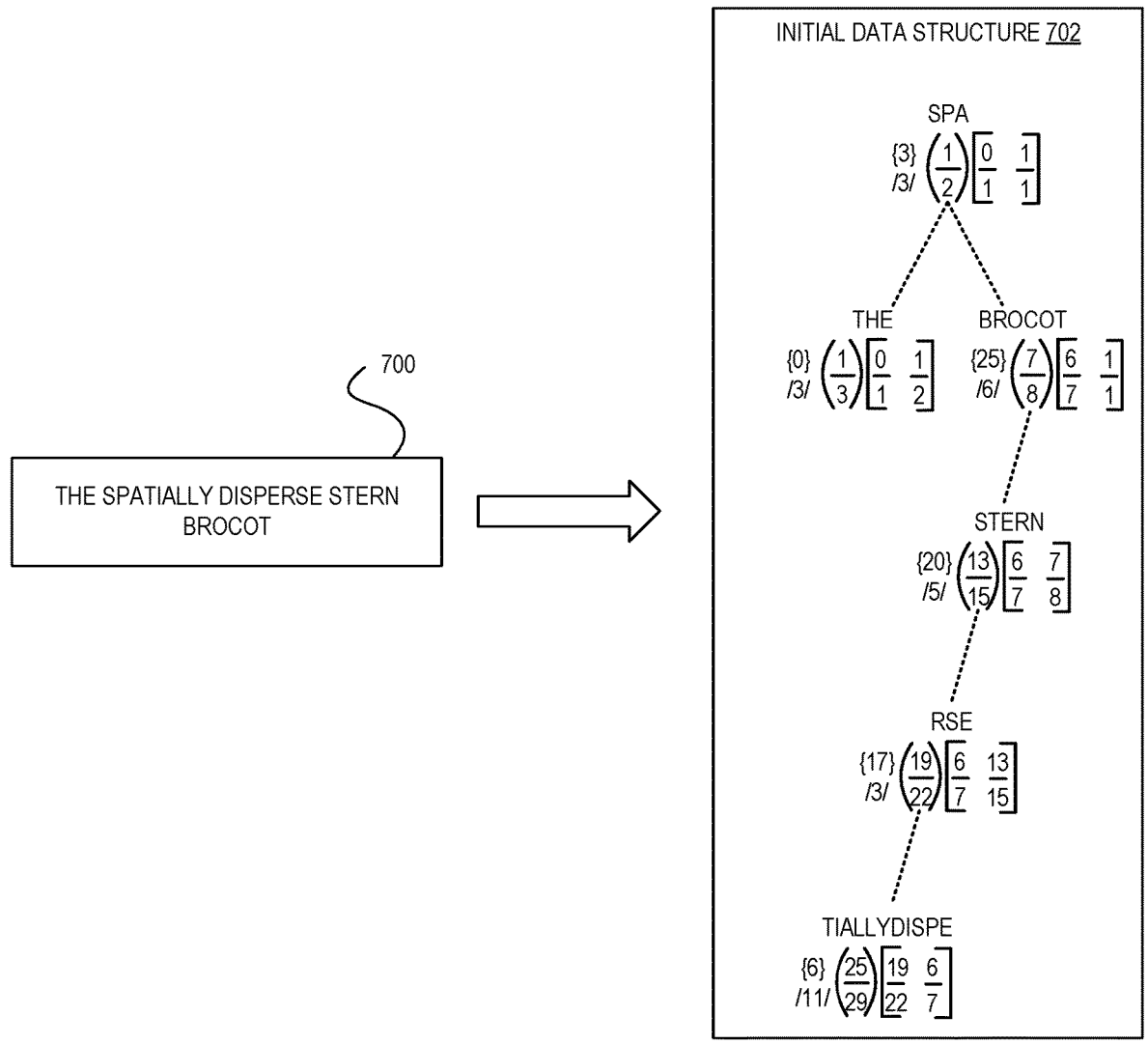
FIGS. 7A-7C illustrates an example of updating a Stern-Brocot forest corresponding to deleted text, in accordance with one or more embodiments.
Figure 7B:
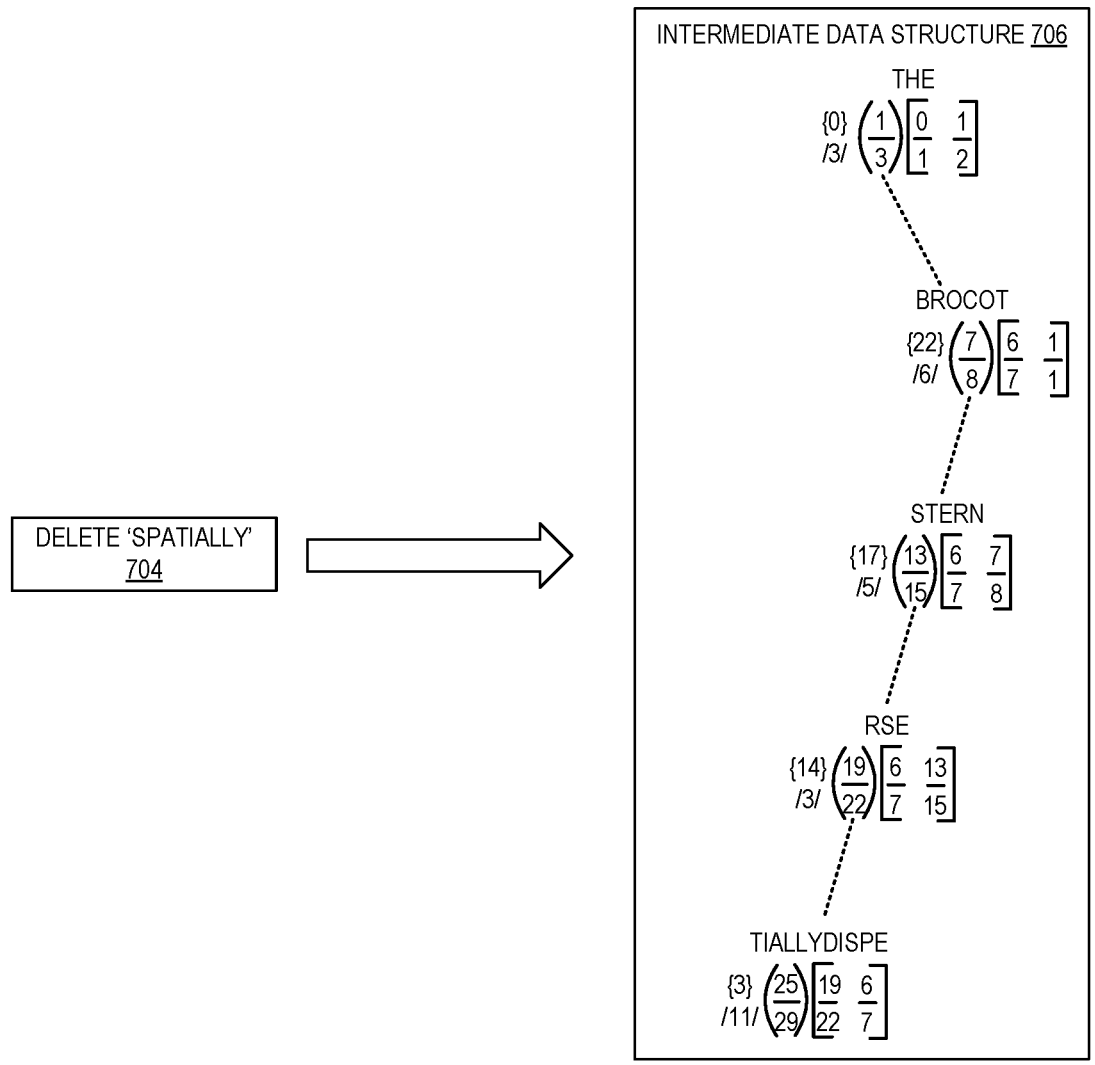
Figure 7C:
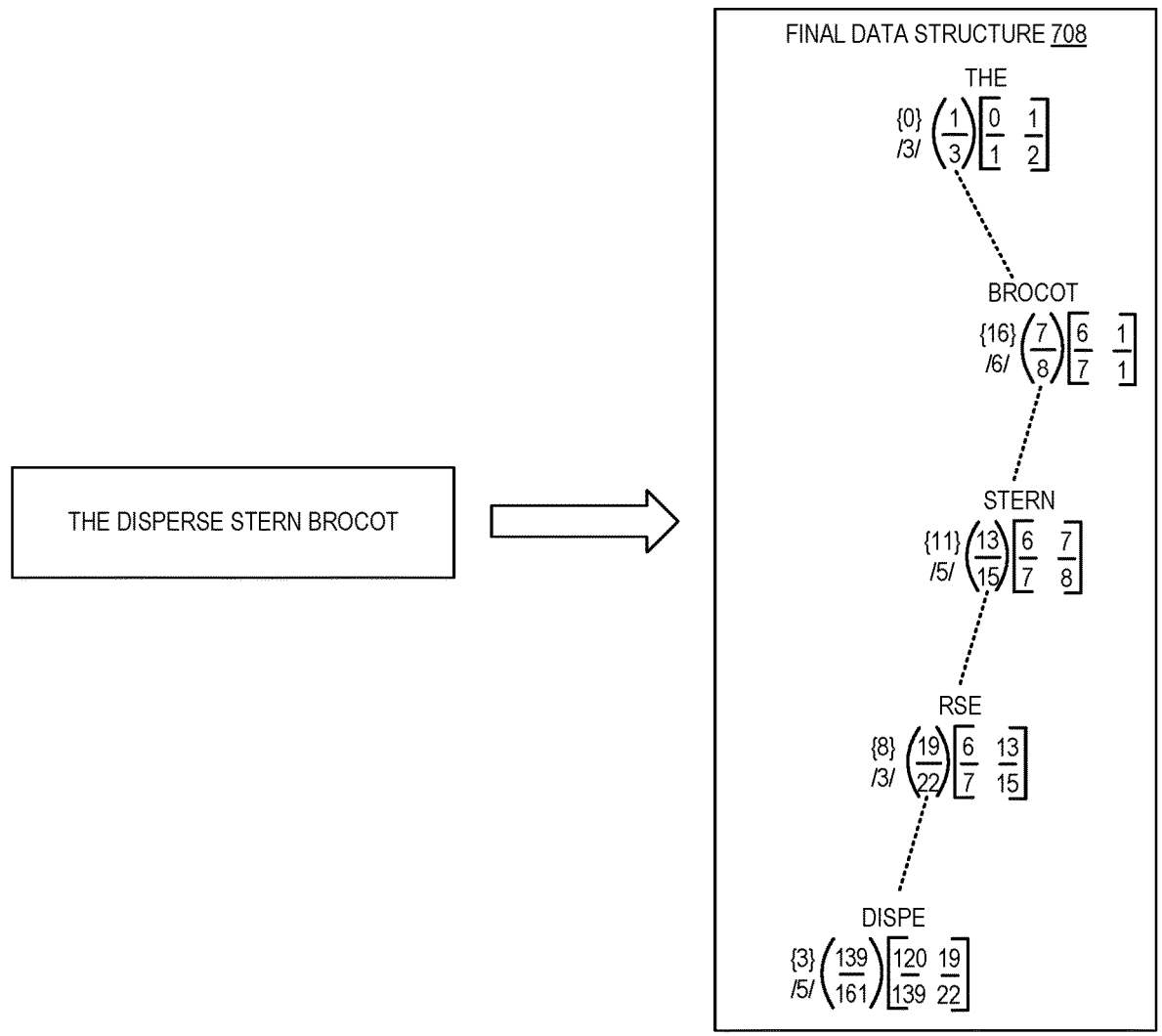

FIGS. 7A-7C illustrates an example of updating a Stern-Brocot tree corresponding to deleted text, in accordance with one or more embodiments. In addition to element insertion, elements may also be deleted. This can include elements represented by both implicit and explicit indices (e.g., initial nodes and newly added nodes in Stern-Brocot trees), including compound nodes. Initial elements (e.g., elements corresponding to the text at the initial state) represented by implicit indices are not stored as part of the forest data structure. As such, deletion of implicitly indexed elements may be handled differently than explicitly indexed elements. Because elements represented by implicit indices have no storage component, there is nowhere to store an indicator (e.g., a flag) of that element's deletion. Accordingly, a different data structure can be created that maintains a list of deleted implicit indices. This may include a data structure that maps to the implicit indices and includes a flag indicating whether a given implicit index's element has been deleted. Alternatively, the indicator can be stored as part of its corresponding segment. In such an instance, each segment may be associated with a data structure such as the following:

```
Struct Segment contains
 |  bool isSegmentHookDeleted;
 |  std::set<SternBrocotNode> sternBrocotTree;
 end
```

No segment physically exists until an element is inserted into it or its segment hook is deleted. When the latter happens, the corresponding flag in the segment is set to true. In contrast, when an explicitly indexed element is deleted, it needs to be deleted such that its global index is not subsequently reused. In some embodiments, this may include setting a flag for tier two nodes similar to tier one nodes to indicate deletion. This consumes additional memory that could otherwise be freed but ensures that changes are not mistakenly applied to the wrong node due to improper indexing. In particular, by maintaining this node data structure that indicates a particular element is deleted, that element's global index will not be mistakenly reassigned to subsequently added text. Similarly, a compound node may be associated with a data structure that indicates a range of global indices that have been deleted and should therefore not be reused. In some embodiments, each node can maintain how many nodes to the left of that node have been deleted and how many nodes to the right of that node have been deleted. This can be used to correctly index subsequently created nodes. If a large number of nodes have been deleted, it may be more efficient to maintain counters as opposed to flags or other data. In some embodiments, a threshold may be used to determine which method of tracking deleted nodes is used.

In some embodiments, if an implicitly indexed element is re-inserted after deletion, the deleted segment hook is not restored. Instead, the new insertion is treated like any other normal insertion by adding a new Stern-Brocot node. This ensures that the new node gets an unconsumed global index and there is no conflict from any in-flight remote operation that still needs to be applied to the locally deleted implicit index.

Element deletion for compound nodes presents more of a challenge. In the example of FIG. 5B, the state of the text after $T_5$ includes the text 'TheSpatiallyDisperseSternBrocot'. FIG. 7A shows this text 700 and corresponding data structure 702. If the co-editor then deletes the text 'Spatially', this would leave only 'TheDisperseSternBrocot'. This is a complex delete operation as it affects multiple nodes. As in a normal (without compound nodes) Sparse Stern-Brocot Forest, a delete operation does not change global indices of nodes left after deletion. When text is deleted, the local index associated with the deletion operation and the number of characters deleted are determined. In this instance, since the deletion operation happened at local index 3 (e.g., corresponding to the 'S' in 'Spa') and a total of nine characters (corresponding to the number of characters in 'Spatially') need to be deleted, the system performs multiple deletion operations (e.g., inside one node at a time) until the deletion count is achieved.

In some embodiments, the deletion operation includes locating the node including local index 3. In this instance, this node is the root compound node 'Spa'. Next the deletion length is compared to the size of the compound node. In this example, the deletion length of nine is more than the length of this compound node, which is three, therefore the entire node can be deleted. As a result, either a node from left subtree, or right subtree, would take its place (depending upon tree implementation and balancing protocol). For the purposes of explanation, it is assumed that the left child replaces the deleted node.

FIG. 7B shows an intermediate stage of the data structure 706 following a delete operation 704. As shown in FIG. 7B, no global indices are changed in the process. In the intermediate data structure 706, the 'Spa' compound node has been deleted and replaced by the left child node, 'The' compound node. The local index of the 'The' compound node has been updated to 0 while the global index remains unchanged. The other nodes have had their local indices updated similarly, without any changes to their global indices. At this stage, six characters now need to be deleted from the text character which is now at location 3 (e.g., the first character of the 'tiallyDispe' compound node).

Since the length of this node is more than the number of outstanding characters to be deleted (e.g., 6), the node is not entirely removed, but is instead adjusted to reflect the deleted characters. In this case, the first six characters of this node are deleted, so its global index is updated to that of the first character remaining after deletion (e.g., 'D'). The result is shown in final data structure 708. Note that the global indices of deleted characters are lost forever, but the other characters remain unchanged. As discussed above, a data structure associated with the 'Dispe' (formerly 'tiallyDispe') compound node may be maintained which indicates the range of global indices associated with the deleted characters to ensure that those global indices are not reused if new text is later added. If characters are deleted from the right end of a compound node, the node's length field is updated and no global indices in the tree need any change. And if only a compound node's middle characters are deleted, the node needs to be split and removal from the middle is performed. Splitting ensures the existing characters retain their global indices. For any delete, communication to co-editors happens with the global index of first character to be deleted along with the count of deletions.

Figure 8:
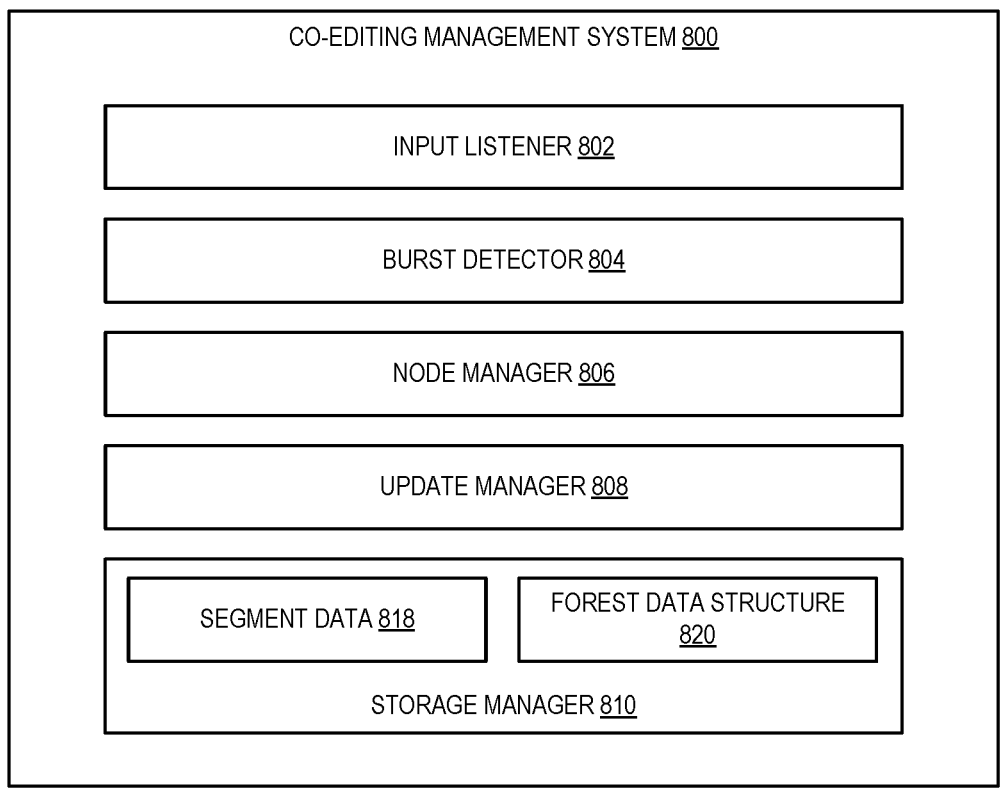
FIG. 8 illustrates a schematic diagram of a co-editing management system in accordance with one or more embodiments.

FIG. 8 illustrates a schematic diagram of co-editing management system (e.g., "co-editing management system" described above) in accordance with one or more embodiments. As shown, the co-editing management system 800 may include, but is not limited to, an input listener 802, a node manager 806, an update manager 808, and a storage manager 810. The storage manager 810 includes segment data 818 and forest data structure 820.

As illustrated in FIG. 8, the co-editing management system 800 includes an input listener 802. As discussed, the co-editing management system 800 may be implemented as part of a digital design system or other system or application which enables multiple users to simultaneously edit a document. Alternatively, the co-editing management system 800 can be in communication with a digital design system or similar application to propagate changes made by one user to other co-editing parties. Regardless of implementation, the input listener 802 monitors operations performed in the digital design system on the co-edited document. The input listener determines whether the operation is relevant for co-editing purposes. For example, the input may include changing the view, page, or other properties of the co-edited document. Such inputs can be ignored. However, if the input results in a change to text of the co-edited document, then the input listener 802 passes details of the change to burst detector 804.

As further illustrated in FIG. 8, the co-editing management system 800 may further include a burst detector 804. The burst detector 804 is responsible for identifying bursts (e.g., groups) of text inputs. As discussed, text is often input as bursts, either through typing or through a copy-paste operation. The burst can include any collection of text inputs that are bounded by a start event and an end event. For example, the burst detector 804 groups text characters together when the user is typing or when the user pastes content into the co-edited document. Various application-specific criteria can be used to detect and create these bursts. For example, a burst may start when typing (or other character input) is detected and end when a whitespace (e.g., a new line) character is typed. Alternatively, a burst may start when text input is detected and end when a pause greater than a threshold value is detected. Similarly, a burst may start when text is input and end when a disjoint action (e.g., a deletion after an insertion) is detected. In some embodiments, bursts align with the undo/redo behavior of the application. For example, one burst can be made the same size as the application would undo when user performs an undo action. Alternatively, applications that support very granular undo/redo operations (e.g., per character) may define bursts based on other events, as discussed above.

In some embodiments, the burst detector 804 also manages conflicts between bursts. For example, multiple co-editors can simultaneously type bursts inside a text object. Whichever burst finishes first (e.g., ordered by server timestamp, global clock, etc.), gets transported to other clients. However, to provide quick user feedback, all local edits are generally immediately reflected (e.g., on-screen) as their burst is getting constructed in parallel. The burst is sent to others later in time when the burst completes. Thus, if a remote burst arrives (meaning, it has already been ordered) while a local one is being constructed, the former needs to be given precedence and applied first. If the local and remote bursts apply to different segments of the Sparse Stern-Brocot Forest, both can readily merge and there is no need to reorder remote and local bursts. However, if both apply to the same segment this is a conflict. Applications can define their own conflict resolution protocol or perform a transaction inversion where the local burst is rolled back, remote applied first and local atop the result.

As further illustrated in FIG. 8, the co-editing management system 800 may further include a node manager 806. The node manager 806 can determine which element of the sequential array is associated with the change. For example, for text data, the change may include adding, deleting, or replacing text characters. Each character of text in the initial state of the document corresponds to an element. When the change includes adding an element, the node manager 806 is also responsible for determining whether the forest data structure 820 includes a Stern-Brocot tree corresponding to the changed element. If no Stern-Brocot tree exists, the node manager can create a new one. If a Stern-Brocot tree does exist, the node manager can create a new node corresponding to the new element. As discussed, for bursts of text, the new node is a compound node which corresponds to all of the characters of the burst and indicates the length of the compound node in addition to its index. When the change includes deleting an element, the segment data structure is responsible for determining whether the deleted element is implicitly or explicitly indexed and update accordingly. For example, the node manager 806 can update segment data 818 with a flag indicating that an implicitly indexed element has been deleted. Additionally, the node manager 806 can delete the corresponding node from the forest data structure 820 for explicitly indexed elements. For compound nodes, the node manager can determine which node or nodes correspond to the deleted text and delete or update the nodes as needed, as discussed above.

As further illustrated in FIG. 8, the co-editing management system 800 may further include an update manager 808. The update manager 808 generates an update to be sent to all co-editing parties. The update includes a global index, received from the node manager, of the node that corresponds to the change. For compound nodes, the update also includes the length of the compound nodes. In some embodiments, the compound nodes are associated with text data which may be included with the node or referenced by the node. In such instances, rather than explicitly including the length of the compound nodes, the length is inferred from the number of characters in the associated text data. As discussed, the update can be sent by the update manager to a co-editing server which then shares the update with other co-editing parties.

As illustrated in FIG. 8, the co-editing management system 800 also includes the storage manager 810. The storage manager 810 maintains data for the co-editing management system 800. The storage manager 810 can maintain data of any type, size, or kind as necessary to perform the functions of the co-editing management system 800. The storage manager 810, as shown in FIG. 8, includes the segment data 818. As discussed, any given segment of the forest data structure may include its own data that is used to store a flag that indicates whether any of the implicitly indexed elements have been deleted. The storage manager 810 also include the forest data structure 820. As discussed, the forest data structure may be a two-tiered data structure used to represent a sequential array, such as text data. The first tier may be a logical tier that is indexed implicitly based on the structure of the array. The second tier may be a physical tier which includes one or more Stern-Brocot trees that represent changes made to the array (e.g., added elements, reordered elements, deleted elements, etc.). Since the first tier is implicitly indexed, there are no startup delays due to explicitly indexing elements and it does not consume memory. The use of Stern-Brocot trees provides an efficient way to represent indices that can be readily converted from local indices to global indices to ensure changes are propagated accurately.

Each of the components 802-808 of the co-editing management system 800 and their corresponding elements (as shown in FIG. 8) may be in communication with one another using any suitable communication technologies. It will be recognized that although components 802-808 and their corresponding elements are shown to be separate in FIG. 8, any of components 802-808 and their corresponding elements may be combined into fewer components, such as into a single facility or module, divided into more components, or configured into different components as may serve a particular embodiment.

The components 802-808 and their corresponding elements can comprise software, hardware, or both. For example, the components 802-808 and their corresponding elements can comprise one or more instructions stored on a computer-readable storage medium and executable by processors of one or more computing devices. When executed by the one or more processors, the computer-executable instructions of the co-editing management system 800 can cause a client device and/or a server device to perform the methods described herein. Alternatively, the components 802-808 and their corresponding elements can comprise hardware, such as a special purpose processing device to perform a certain function or group of functions. Additionally, the components 802-808 and their corresponding elements can comprise a combination of computer-executable instructions and hardware.

Furthermore, the components 802-808 of the co-editing management system 800 may, for example, be implemented as one or more stand-alone applications, as one or more modules of an application, as one or more plug-ins, as one or more library functions or functions that may be called by other applications, and/or as a cloud-computing model. Thus, the components 802-808 of the co-editing management system 800 may be implemented as a stand-alone application, such as a desktop or mobile application. Furthermore, the components 802-808 of the co-editing management system 800 may be implemented as one or more web-based applications hosted on a remote server. Alternatively, or additionally, the components of the co-editing management system 800 may be implemented in a suit of mobile device applications or "apps."

Figure 9:
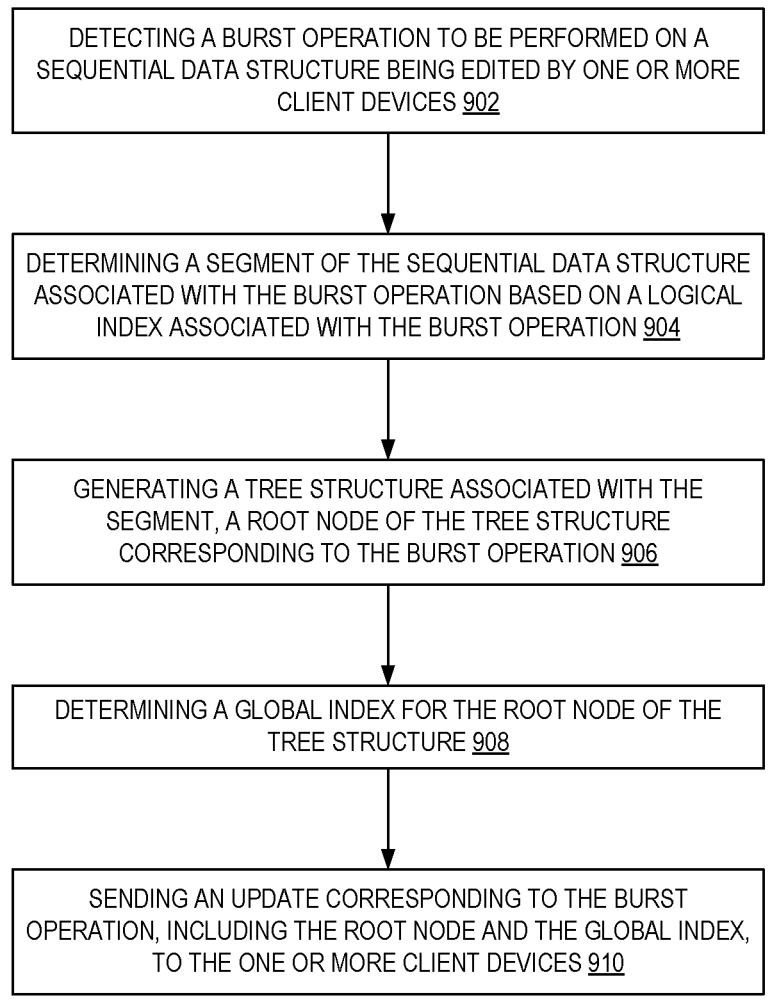
FIG. 9 illustrates a flowchart of a series of acts in a method of co-editing management in accordance with one or more embodiments.

FIGS. 1-8, the corresponding text, and the examples, provide a number of different systems and devices that implement co-editing management as described herein. In addition to the foregoing, embodiments can also be described in terms of flowcharts comprising acts and steps in a method for accomplishing a particular result. For example, FIG. 9 illustrates a flowchart of an exemplary method in accordance with one or more embodiments. The method described in relation to FIG. 9 may be performed with fewer or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart 900 of a series of acts in a method of co-editing management in accordance with one or more embodiments. In one or more embodiments, the method 900 is performed in a digital medium environment that includes the co-editing management system 800. The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of detecting a burst operation to be performed on a sequential data structure being edited by one or more client devices. In some embodiments, the burst operation includes a plurality of changes made to the sequential data structure. In some embodiments, detecting a burst operation to be performed on a sequential data structure being edited by one or more client devices, further comprises monitoring inputs received at a client device, identifying a burst end event indicating an end of the inputs, and associating the plurality of changes corresponding to the inputs with the burst operation. In some embodiments, the burst end event includes one or more of a pause in the inputs greater than a threshold time, a change in edit location in the sequential data structure, or a change in input type.

In some embodiments, the sequential data structure represents text data, and each element of the sequential data structure corresponds to a character of the text data. In some embodiments, the burst operation includes inserting a plurality of new characters, deleting a plurality of existing characters, or replacing a first plurality of characters with a second plurality of characters.

As illustrated in FIG. 9, the method 900 also includes an act 904 of determining a segment of the sequential data structure associated with the burst operation based on a logical index associated with the burst operation. As discussed, the segment of the sequential data structure may be determined based on the indices associated with the element(s) being edited, the location where an element is being added, etc.

As illustrated in FIG. 9, the method 900 also includes an act 906 of generating a tree structure associated with the segment, a root node of the tree structure corresponding to the burst operation. In some embodiments, the root node is a compound node representing a plurality of contiguous changed elements associated with the burst operation and wherein the root node indicates a number of contiguous changed elements it represents. As discussed, when a compound node is added, other nodes' local indices are updated based on the length of the compound node. For example, in some embodiments, the method further includes updating a local index of each data element in the sequential data structure following the root node based on the number of contiguous changed elements associated with the root node.

In some embodiments, the method further includes detecting a second burst operation to be performed on the sequential data structure, determining the second burst operation is associated with the segment, identifying a global index associated with the second burst operation based on the root node and the number of contiguous changed elements associated with the root node, and adding a second compound node associated with the second burst operation using the global index.

As illustrated in FIG. 9, the method 900 also includes an act 908 of determining a global index for the root node of the tree structure. As discussed, the global index for the root node of the tree data structure may be determined based on the indices of the parent nodes of the root node. For example, the numerators of the parent nodes and denominators of the parent nodes may be summed to determine the numerator and denominator of the root node. The fraction represented by the numerator and denominator of the root node is the global index of the root node.

As illustrated in FIG. 9, the method 900 also includes an act 910 of sending an update corresponding to the burst operation, including the root node and the global index, to the one or more client devices. As discussed, for compound nodes, the update may further include the length of the node and/or the text associated with the compound node.

In some embodiments, the method further comprises detecting a second burst operation to be performed on the sequential data structure, determining the second burst operation inserts one or more data elements at an element location of the root node, changing a length of the root node based on the second burst operation, wherein the length corresponds to a number of elements associated with the root node up to the element location, adding a first compound node and a second compound node based on the second burst operation, wherein the first compound node corresponds to one or more data elements from after the element location of the root node and the second compound node corresponds to the one or more new data elements associated with the second burst operation, and assigning a global index to the first compound node and the second compound node. For example, when the root node splits, three nodes are involved: the modified root node and two new nodes. The length of the original root node is reduced, and two new nodes are created. If the root node includes n elements and the split took place at the ith index, then after the split, the root node will include the first i elements. One of the new nodes will have the content added in the new burst and other new node will have the remaining n-i elements from the original root node.

Figure 10:
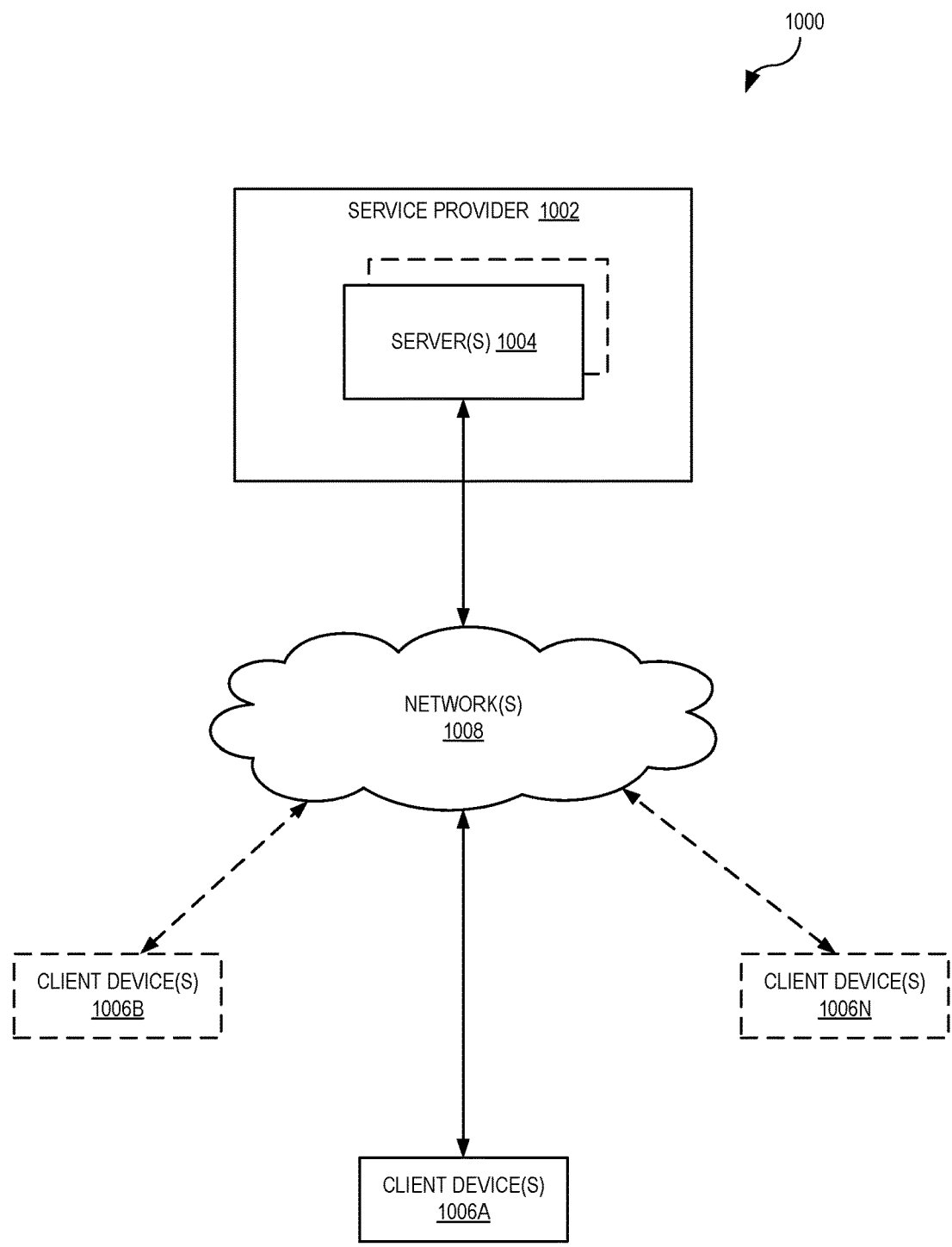
FIG. 10 illustrates a schematic diagram of an exemplary environment in which the co-editing management system can operate in accordance with one or more embodiments.

FIG. 10 illustrates a schematic diagram of an exemplary environment 1000 in which the co-editing management system 800 can operate in accordance with one or more embodiments. In one or more embodiments, the environment 1000 includes a service provider 1002 which may include one or more servers 1004 connected to a plurality of client devices 1006A-1006N via one or more networks 1008. The client devices 1006A-1006N, the one or more networks 1008, the service provider 1002, and the one or more servers 1004 may communicate with each other or other components using any communication platforms and technologies suitable for transporting data and/or communication signals, including any known communication technologies, devices, media, and protocols supportive of remote data communications, examples of which will be described in more detail below with respect to FIG. 11.

Although FIG. 10 illustrates a particular arrangement of the client devices 1006A-1006N, the one or more networks 1008, the service provider 1002, and the one or more servers 1004, various additional arrangements are possible. For example, the client devices 1006A-1006N may directly communicate with the one or more servers 1004, bypassing the network 1008. Or alternatively, the client devices 1006A-1006N may directly communicate with each other. The service provider 1002 may be a public cloud service provider which owns and operates their own infrastructure in one or more data centers and provides this infrastructure to customers and end users on demand to host applications on the one or more servers 1004. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1004. In some embodiments, the service provider may be a private cloud provider which maintains cloud infrastructure for a single organization. The one or more servers 1004 may similarly include one or more hardware servers, each with its own computing resources, which are divided among applications hosted by the one or more servers for use by members of the organization or their customers.

Similarly, although the environment 1000 of FIG. 10 is depicted as having various components, the environment 1000 may have additional or alternative components. For example, the environment 1000 can be implemented on a single computing device with the co-editing management system 800. In particular, the co-editing management system 800 may be implemented in whole or in part on the client device 1002A.

As illustrated in FIG. 10, the environment 1000 may include client devices 1006A-1006N. The client devices 1006A-1006N may comprise any computing device. For example, client devices 1006A-1006N may comprise one or more personal computers, laptop computers, mobile devices, mobile phones, tablets, special purpose computers, TVs, or other computing devices, including computing devices described below with regard to FIG. 11. Although three client devices are shown in FIG. 10, it will be appreciated that client devices 1006A-1006N may comprise any number of client devices (greater or smaller than shown).

Moreover, as illustrated in FIG. 10, the client devices 1006A-1006N and the one or more servers 1004 may communicate via one or more networks 1008. The one or more networks 1008 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1008 may be any suitable network over which the client devices 1006A-1006N may access service provider 1002 and server 1004, or vice versa. The one or more networks 1008 will be discussed in more detail below with regard to FIG. 11.

In addition, the environment 1000 may also include one or more servers 1004. The one or more servers 1004 may generate, store, receive, and transmit any type of data, including segment data 818 and forest data structure 820, or other information. For example, a server 1004 may receive data from a client device, such as the client device 1006A, and send the data to another client device, such as the client device 1002B and/or 1002N. The server 1004 can also transmit electronic messages between one or more users of the environment 1000. In one example embodiment, the server 1004 is a data server. The server 1004 can also comprise a communication server or a web-hosting server. Additional details regarding the server 1004 will be discussed below with respect to FIG. 11.

As mentioned, in one or more embodiments, the one or more servers 1004 can include or implement at least a portion of the co-editing management system 800. In particular, the co-editing management system 800 can comprise an application running on the one or more servers 1004 or a portion of the co-editing management system 800 can be downloaded from the one or more servers 1004. For example, the co-editing management system 800 can include a web hosting application that allows the client devices 1006A-1006N to interact with content hosted at the one or more servers 1004. To illustrate, in one or more embodiments of the environment 1000, one or more client devices 1006A-1006N can access a webpage supported by the one or more servers 1004. In particular, the client device 1006A can run a web application (e.g., a web browser) to allow a user to access, view, and/or interact with a webpage or website hosted at the one or more servers 1004.

As just described, the co-editing management system 800 may be implemented in whole, or in part, by the individual elements 1002-1008 of the environment 1000. It will be appreciated that although certain components of the co-editing management system 800 are described in the previous examples with regard to particular elements of the environment 1000, various alternative implementations are possible. For instance, in one or more embodiments, the co-editing management system 800 is implemented on any of the client devices 1006A-N. Similarly, in one or more embodiments, the co-editing management system 800 may be implemented on the one or more servers 1004. Moreover, different components and functions of the co-editing management system 800 may be implemented separately among client devices 1006A-1006N, the one or more servers 1004, and the network 1008.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
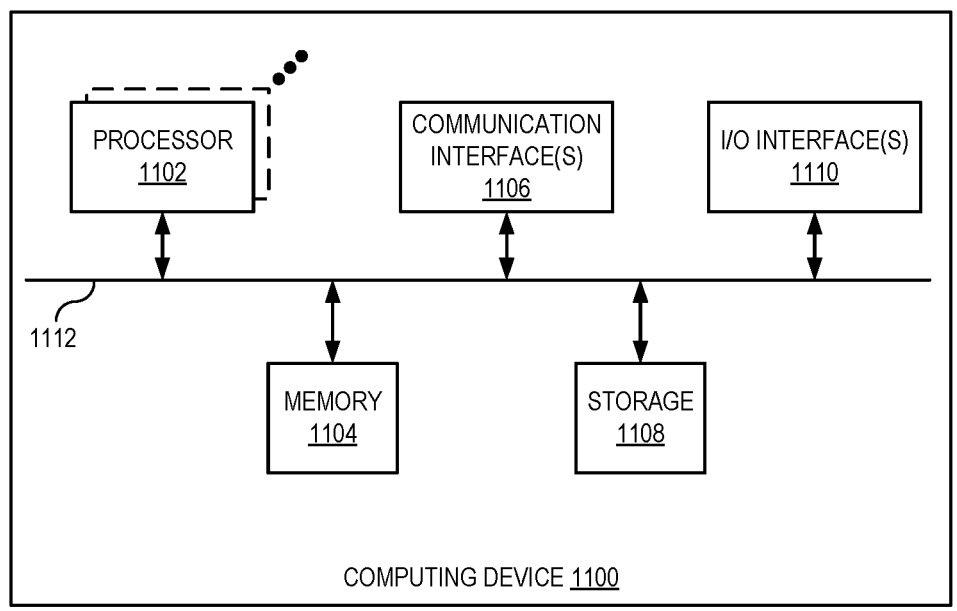
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the co-editing management system. As shown by FIG. 11, the computing device can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
    detecting a burst operation to be performed on a sequential data structure being edited by one or more client devices;
    determining a segment of the sequential data structure associated with the burst operation based on a logical index associated with the burst operation;
    generating a tree structure associated with the segment, a root node of the tree structure corresponding to the burst operation;
    determining a global index for the root node of the tree structure, wherein the global index is a fractional index determined using a first global index of the sequential data structure and a second global index of the sequential data structure; and
    sending an update corresponding to the burst operation, including the root node and the global index, to the one or more client devices.

2. The method of claim 1, wherein the root node is a compound node representing a plurality of contiguous changed elements associated with the burst operation and wherein the root node indicates a number of contiguous changed elements it represents.

3. The method of claim 2, further comprising:
updating a local index of each data element in the sequential data structure following the root node based on the number of contiguous changed elements associated with the root node.

4. The method of claim 2, further comprising:
detecting a second burst operation to be performed on the sequential data structure;
determining the second burst operation is associated with the segment;
identifying a global index associated with the second burst operation based on the root node and the number of contiguous changed elements associated with the root node; and
adding a second compound node associated with the second burst operation using the global index.

5. The method of claim 2, further comprising:
detecting a second burst operation to be performed on the sequential data structure;
determining the second burst operation inserts one or more new data elements at an element location of the root node;
changing a length of the root node based on the second burst operation, wherein the length corresponds to a number of elements associated with the root node up to the element location;
adding a first compound node and a second compound node based on the second burst operation, wherein the first compound node corresponds to one or more data elements from after the element location of the root node and the second compound node corresponds to the one or more new data elements associated with the second burst operation; and
assigning global indices to the first compound node and the second compound node.

6. The method of claim 1, wherein the burst operation includes a plurality of changes made to the sequential data structure.

7. The method of claim 6, wherein detecting a burst operation to be performed on a sequential data structure being edited by one or more client devices, further comprises:
monitoring inputs received at a client device;
identifying a burst end event indicating an end of the inputs; and
associating the plurality of changes corresponding to the inputs with the burst operation.

8. The method of claim 7, wherein the burst end event includes one or more of a pause in the inputs greater than a threshold time, a change in edit location in the sequential data structure, or a change in input type.

9. The method of claim 1, wherein the sequential data structure represents text data and wherein each element of the sequential data structure corresponds to a character of the text data.

10. The method of claim 9, wherein the burst operation includes inserting a plurality of new characters, deleting a plurality of existing characters, or replacing a first plurality of characters with a second plurality of characters.

11. A non-transitory computer-readable medium storing executable instructions, which when executed by a processing device, cause the processing device to perform operations comprising:

detecting a burst operation to be performed on a sequential data structure being edited by one or more client devices;
determining a segment of the sequential data structure associated with the burst operation based on a logical index associated with the burst operation;
generating a tree structure associated with the segment, a root node of the tree structure corresponding to the burst operation;
determining a global index for the root node of the tree structure, wherein the global index is a fractional index determined using a first global index of the sequential data structure and a second global index of the sequential data structure; and
sending an update corresponding to the burst operation, including the root node and the global index, to the one or more client devices.

12. The non-transitory computer-readable medium of claim 11, wherein the root node is a compound node representing a plurality of contiguous changed elements associated with the burst operation and wherein the root node indicates a number of contiguous changed elements it represents.

13. The non-transitory computer-readable medium of claim 12, further comprising:
updating a local index of each data element in the sequential data structure following the root node based on the number of contiguous changed elements associated with the root node.

14. The non-transitory computer-readable medium of claim 12, further comprising:
detecting a second burst operation to be performed on the sequential data structure;
determining the second burst operation is associated with the segment;
identifying a global index associated with the second burst operation based on the root node and the number of contiguous changed elements associated with the root node; and
adding a second compound node associated with the second burst operation using the global index.

15. The non-transitory computer-readable medium of claim 12, further comprising:
detecting a second burst operation to be performed on the sequential data structure;
determining the second burst operation inserts one or more new data elements at an element location of the root node;
changing a length of the root node based on the second burst operation, wherein the length corresponds to a number of elements associated with the root node up to the element location;
adding a first compound node and a second compound node based on the second burst operation, wherein the first compound node corresponds to one or more data elements from after the element location of the root node and the second compound node corresponds to the one or more new data elements associated with the second burst operation; and
assigning global indices to the first compound node and the second compound node.

16. The non-transitory computer-readable medium of claim 11, wherein the burst operation includes a plurality of changes made to the sequential data structure.

17. The non-transitory computer-readable medium of claim 16, wherein detecting a burst operation to be performed on a sequential data structure being edited by one or more client devices, further comprises:

monitoring inputs received at a client device;

identifying a burst end event indicating an end of the inputs; and associating the plurality of changes corresponding to the inputs with the burst operation.

18. The non-transitory computer-readable medium of claim 17, wherein the burst end event includes one or more of a pause in the inputs greater than a threshold time, a change in edit location in the sequential data structure, or a change in input type.

19. The non-transitory computer-readable medium of claim 11, wherein the sequential data structure represents text data and wherein each element of the sequential data structure corresponds to a character of the text data, and wherein the burst operation includes inserting a plurality of new characters, deleting a plurality of existing characters, or replacing a first plurality of characters with a second plurality of characters.

20. A system comprising:

a memory component; and a processing device coupled to the memory component, the processing device to perform operations comprising:

receiving text input to be added to a text document being edited by one or more client devices;

determining a segment associated with the text input based on a logical index associated with a location in the text document where the text input is added;

generating a tree data structure associated with the segment, a root node of the tree data structure including a number of characters in the text input;

determining a global index for the root node of the tree data structure, wherein the global index is a fractional index determined using a first global index of the text document and a second global index of the text document; and causing the text input to be replicated to one or more client devices using the global index.

\* \* \* \* \*